United States Patent
Nakamura et al.

(10) Patent No.: US 10,834,334 B2
(45) Date of Patent: Nov. 10, 2020

(54) EFFECT SWITCHER AND SWITCHER SYSTEM

(71) Applicant: SONY CORPORATION, Tokyo (JP)

(72) Inventors: Sensaburo Nakamura, Kanagawa (JP); Norimasa Ozaki, Kanagawa (JP); Takahiro Hirabayashi, Kanagawa (JP); Tetsuya Kikukawa, Kanagawa (JP); Mitsuru Murakami, Kanagawa (JP); Koichi Ichikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 29 days.

(21) Appl. No.: 15/770,589

(22) PCT Filed: Dec. 15, 2016

(86) PCT No.: PCT/JP2016/087456
§ 371 (c)(1),
(2) Date: Apr. 24, 2018

(87) PCT Pub. No.: WO2017/110659
PCT Pub. Date: Jun. 29, 2017

(65) Prior Publication Data
US 2018/0316874 A1    Nov. 1, 2018

(30) Foreign Application Priority Data

Dec. 24, 2015  (JP) .................................. 2015-251095
Dec. 24, 2015  (JP) .................................. 2015-251096

(51) Int. Cl.
*H04N 5/268*  (2006.01)
*H04H 20/10*  (2008.01)
(Continued)

(52) U.S. Cl.
CPC ....... *H04N 5/268* (2013.01); *H04B 10/25751* (2013.01); *H04H 20/10* (2013.01);
(Continued)

(58) Field of Classification Search
CPC ........ H04H 20/10; H04H 20/59; H04H 60/04; H04N 5/268; H04N 21/226; H04N 5/765; H04B 10/80; H04J 14/0256
(Continued)

(56) References Cited

U.S. PATENT DOCUMENTS

2003/0091329 A1* 5/2003 Nakata ................. G11B 27/034
                                                386/281
2005/0174435 A1* 8/2005 Nakajima ............ H04N 5/0733
                                                348/211.99
(Continued)

FOREIGN PATENT DOCUMENTS

JP    6-224881 A    8/1994
JP    10-290419 A   10/1998
(Continued)

OTHER PUBLICATIONS

International Search Report dated Mar. 7, 2017 in PCT/JP2016/087456 filed Dec. 15, 2016.

*Primary Examiner* — Paulos M Natnael
*Assistant Examiner* — Sean N. Haiem
(74) *Attorney, Agent, or Firm* — Oblon, McClelland, Maier & Neustadt, L.L.P.

(57) ABSTRACT

To provide a user with an effect switcher having improved usability.
The effect switcher includes an output terminal that outputs a plurality of first video signals to be transmitted to a multi-view processor, as an optical multiplex signal. For example, the effect switcher further includes: an output terminal that outputs a single second video signal to be transmitted to the multi-view processor; and an information insertion unit that inserts, into the optical multiplex signal, information for designating a display region of an image
(Continued)

based on the single second video signal on a screen on which an image based on each of the first video signals is displayed.

9 Claims, 24 Drawing Sheets

(51) Int. Cl.
| | |
|---|---|
| H04H 60/04 | (2008.01) |
| H04H 20/59 | (2008.01) |
| H04N 5/765 | (2006.01) |
| H04B 10/2575 | (2013.01) |
| H04J 14/02 | (2006.01) |
| H04N 21/226 | (2011.01) |
| H04N 5/44 | (2011.01) |
| H04N 5/445 | (2011.01) |
| H04N 21/47 | (2011.01) |
| H04N 21/431 | (2011.01) |
| H04N 21/422 | (2011.01) |

(52) U.S. Cl.
CPC ............ *H04H 20/59* (2013.01); *H04H 60/04* (2013.01); *H04J 14/0256* (2013.01); *H04N 5/765* (2013.01); *H04N 21/226* (2013.01); *H04N 21/42204* (2013.01); *H04N 21/4316* (2013.01); *H04N 21/47* (2013.01)

(58) Field of Classification Search
USPC ................... 348/564, 705, 660, 722, 211.99; 345/629; 725/95; 386/281, 290; 715/753; 382/233
See application file for complete search history.

(56) References Cited

U.S. PATENT DOCUMENTS

| | | | | |
|---|---|---|---|---|
| 2007/0182864 A1* | 8/2007 | Stoneham | ............... | H04H 60/04 348/722 |
| 2009/0092326 A1* | 4/2009 | Fukuhara | ............. | H04N 19/139 382/233 |
| 2009/0323713 A1* | 12/2009 | Futch | .................... | H04L 5/1438 370/442 |
| 2010/0103325 A1* | 4/2010 | Maegawa | ............ | H04N 5/2624 348/705 |
| 2011/0052155 A1* | 3/2011 | Desmarais | ............... | H04N 5/76 386/290 |
| 2012/0259722 A1* | 10/2012 | Mikurak | ............... | G06Q 10/087 705/26.1 |
| 2014/0040781 A1* | 2/2014 | Epstein | .................. | H04N 5/268 715/753 |
| 2014/0092128 A1* | 4/2014 | Nakamura | ............. | G09G 5/377 345/629 |
| 2014/0344873 A1* | 11/2014 | Rieger | ............... | H04N 21/2408 725/95 |
| 2015/0116595 A1* | 4/2015 | Nakamura | ......... | H04N 21/6106 348/523 |
| 2015/0172559 A1* | 6/2015 | Krug | ...................... | H04N 5/262 348/660 |
| 2015/0296147 A1* | 10/2015 | Obstfelder | ............. | H04N 5/262 348/705 |

FOREIGN PATENT DOCUMENTS

| | | |
|---|---|---|
| JP | 11-175045 A | 7/1999 |
| JP | 2010-103960 A | 5/2010 |
| JP | 2012-14543 A | 1/2012 |

\* cited by examiner

Input Selection

| Group Name | # | Signal Name | # |
|---|---|---|---|
| SDI | 1 | CAM1 | 1 |
| | | CAM2 | 2 |
| | | Remote1 | 3 |
| | | Remote2 | 4 |
| | | In5 | 5 |
| OCH1 | 2 | SCam1 | 1 |
| | | SCam2 | 2 |
| | | Scam3 | 3 |
| | | Scam4 | 4 |
| | | Scam5 | 5 |
| OCH2 | 3 | ch1 | 1 |
| | | ch2 | 2 |
| | | ch3 | 3 |
| | | ch4 | 4 |

FIG.12

Output assign table

| Output Port Number | Internal Signal Number |
|---|---|
| 1 | 1 |
| 2 | 5 |
| 3 | 6 |
| 4 | 10 |
| 5 | 11 |
| 6 | 1 |
| 7 | 2 |
| 8 | 3 |
| 9 | 5 |
| 10 | 6 |
| ... | |

FIG.13

| Group | | Line | Output Signal | |
|---|---|---|---|---|
| Name | # | # | Name | # |
| SDI | 1 | 1 | M/E1 Program1 | 1 |
| | | 2 | M/E2 Program1 | 5 |
| | | 3 | M/E2 Preview1 | 6 |
| | | 4 | FMO2 | 10 |
| | | 5 | FMO3 | 11 |
| Optical1 | 2 | 6 | M/E1 Program1 | 1 |
| | | 7 | M/E1 Preview1 | 2 |
| | | 8 | M/E1 Program2 | 3 |
| | | 9 | M/E2 Program1 | 5 |
| | | 10 | M/E2 Preview1 | 6 |
| | | 11 | FMO1 | 9 |
| Optical2 | 3 | 12 | Aux1 | 101 |
| | | 13 | Aux2 | 102 |
| | | 14 | Aux3 | 103 |
| | | 15 | Aux4 | 104 |

Internal Signal Selection

| Name | # |
|---|---|
| M/E1 Program1 | 1 |
| M/E1 Preview1 | 2 |
| M/E1 Program2 | 3 |
| M/E1 M/EOut4 | 4 |
| M/E2 Program1 | 5 |
| M/E2 Preview1 | 6 |
| M/E2 Clean | 7 |
| M/E2 M/EOut4 | 8 |
| FMO1 | 9 |
| FMO2 | 10 |
| FMO3 | 11 |
| FMO4 | 12 |
| FMO5 | 13 |
| FMO6 | 14 |
| FMO7 | 15 |

Action: [ Set ] [ Delete ] [ Default ]

FIG.14

| Group | | Line | Output Signal | |
|---|---|---|---|---|
| Name | # | # | Name | # |
| SDI | 1 | 1 | M/E1 Program1 | 1 |
| | | 2 | M/E2 Program1 | 5 |
| | | 3 | M/E2 Preview1 | 6 |
| | | 4 | FMO2 | 10 |
| | | 5 | FMO3 | 11 |
| Optical1 | 2 | 1 | M/E1 Program1 | 1 |
| | | 2 | M/E1 Preview1 | 2 |
| | | 3 | M/E1 Program2 | 3 |
| | | 4 | M/E2 Program1 | 5 |
| | | 5 | M/E2 Preview1 | 6 |
| | | 6 | FMO1 | 9 |
| Optical2 | 3 | 1 | Aux1 | 101 |
| | | 2 | Aux2 | 102 |
| | | 3 | Aux3 | 103 |
| | | 4 | Aux4 | 104 |

Internal Signal Selection

| Name | # |
|---|---|
| Aux1 | 101 |
| Aux2 | 102 |
| Aux3 | 103 |
| Aux4 | 104 |
| Aux5 | 105 |
| Aux6 | 106 |
| Aux7 | 107 |
| Aux8 | 108 |
| Aux9 | 109 |
| Aux10 | 110 |
| Aux11 | 111 |
| Aux12 | 112 |
| Aux13 | 113 |
| Aux14 | 114 |
| Aux15 | 115 |

Action: [ Set ] [ Delete ] [ Default ]

FIG.15

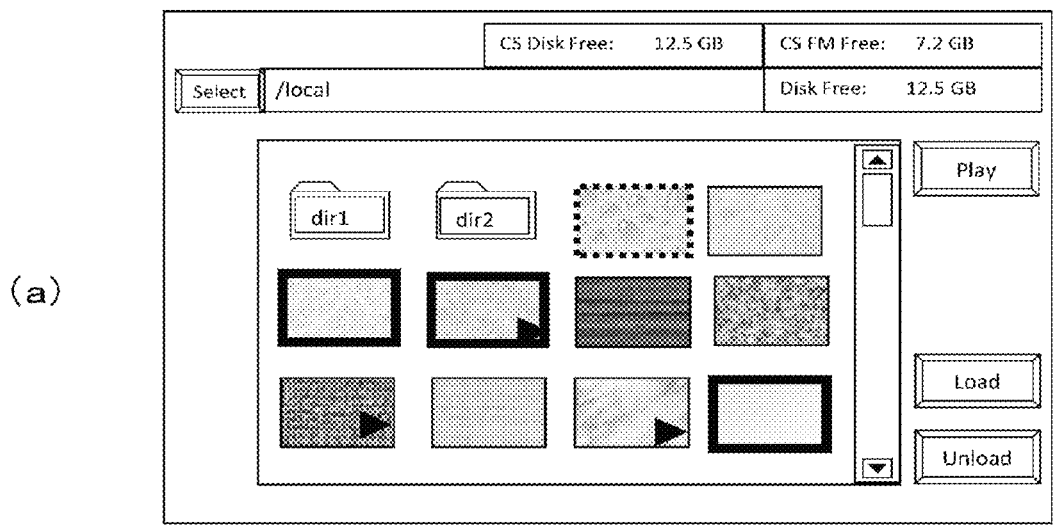
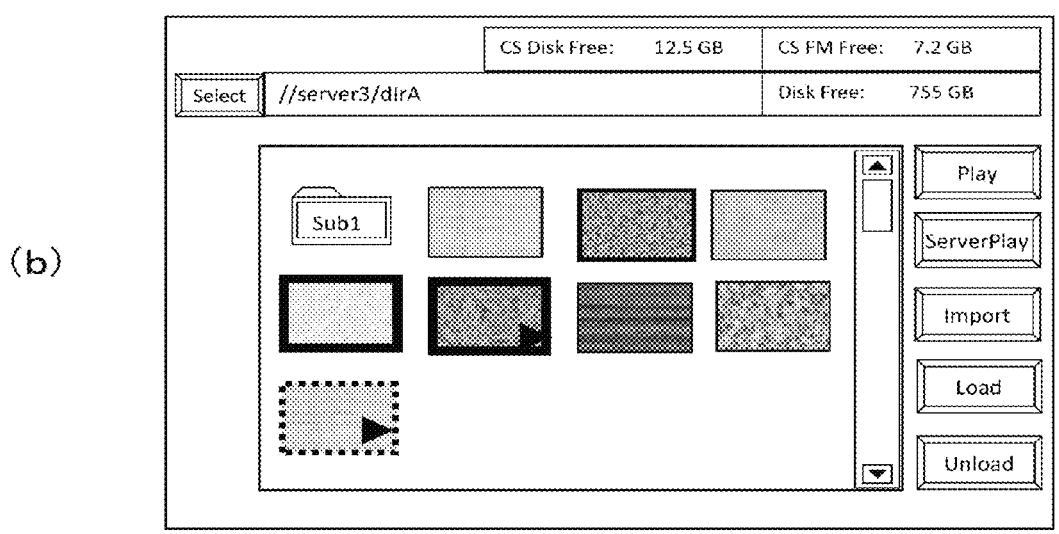
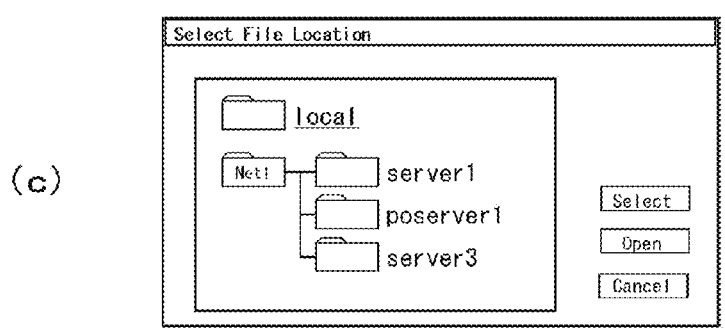
FIG.20

EFFECT SWITCHER AND SWITCHER SYSTEM

TECHNICAL FIELD

The present technology relates to an effect switcher and a switcher system to be used in a studio and the like.

BACKGROUND ART

Conventionally, during production and broadcast of programs, an image special effect apparatus called effect switcher (vision mixer or production switcher) is used for switching between images, superimposing subtitles on an image by keying, disposing another sub-screen on a part of a screen, and the like. For example, Patent Literature 1 describes an example of the effect switcher.

CITATION LIST

Patent Literature

Patent Literature 1: Japanese Patent Application Laid-open No. 2010-103960

DISCLOSURE OF INVENTION

Technical Problem

It is an object of the present technology to provide a user with an effect switcher and a switcher system having improved usability.

Solution to Problem

In accordance with an aspect of the present technology, there is provided an effect switcher including an output terminal that outputs a plurality of first video signals to be transmitted to a multi-view processor, as an optical multiplex signal.

In the present technology, an output terminal that outputs a plurality of first video signals to be transmitted to a multi-view processor, as an optical multiplex signal is provided. Therefore, the multi-view processor can be efficiently supplied with the plurality of first video signals.

Note that, in the present technology, for example, the effect switcher may further include: an output terminal that outputs a single second video signal to be transmitted to the multi-view processor; and an information insertion unit that inserts, into the optical multiplex signal, information for designating a display region of an image based on the single second video signal on a screen on which an image based on each of the first video signals is displayed. With this, a display region of an image based on the single second video signal on a screen on which an image based on each of the first video signals is displayed can be easily and simply designated with respect to the multi-view processor.

Further, in the present technology, for example, the multi-view processor may include an input terminal that inputs the optical multiplex signal, an input terminal that inputs a video signal for emergency, and a control terminal that receives a switching instruction, and may switch, in accordance with the switching instruction, between a first mode on which images based on the plurality of first video signals obtained from the optical multiplex signal are simultaneously displayed on the screen, and a second mode on which an image based on the video signal for emergency is displayed on the screen.

Further, in the present technology, the effect switcher may further include: a plurality of video input circuits that externally input video signals; a plurality of internal buses; a selection circuit that selects one from among the plurality of video input circuits and connects the selected one to each of the plurality of internal buses; a superimpose circuit that receives video signals from the plurality of internal buses; a table that stores correspondence between input identifiers, which are given to the plurality of video input circuits correspondingly to the plurality of internal buses, and button numbers; and a selection control circuit that obtains, when a button is operated with respect to a certain internal bus, an input identifier corresponding to a button number of the operated button by referring to the table, and controls the selection circuit such that a video input circuit corresponding to this input identifier is connected to the certain internal bus.

In this case, for example, the effect switcher may further include: a display control unit that displays a user interface screen for editing the table; and a table editor unit that receives, on the user interface screen, an operation of making an input identifier to correspond to a button number, and updates the table. For example, the input identifiers may be displayed in groups on the user interface screen. In this case, the user can efficiently edit the table on the user interface screen.

Further, in accordance with another aspect of the present technology, there is provided a switcher system including: a switcher including a clip storage unit; and a GUI control unit that is connected to the switcher through a control communication path, in which the clip storage unit includes a video signal generation circuit that supplies a cross point with a video signal, and file storage connected to the video signal generation circuit through a dedicated wire, and the GUI control unit is connected to a video server via a network.

In the present technology, the switcher includes a clip storage unit. The GUI control unit is connected to this switcher through a control communication path. The clip storage unit includes a video signal generation circuit that supplies a cross point with a video signal, and file storage connected to this video signal generation circuit through a dedicated wire, and the GUI control unit is connected to a video server via a network. The GUI control unit is connected to a video server via a network.

As described above, in the present technology, it is the GUI control unit that is connected to the video server via the network. Therefore, the GUI control unit can handle not only a video file in the file storage of the clip storage unit, but also a video file in the video server connected via the network.

Note that, in the present technology, for example, the GUI control unit may selectively display a first user interface screen showing a video file in the file storage of the clip storage unit, or a second user interface screen showing a video file in the video server. Selectively displaying the first user interface screen or the second user interface screen in this manner enables the user (operator) to correctly recognize the video file in the file storage of the clip storage unit and the video file in the video server and perform control operations.

Further, in the present technology, for example, the GUI control unit may display a third user interface screen for selecting display of the video file in the file storage of the clip storage unit or display of the video file in the video server, and may receive a selection operation on the third user interface screen, and display the first user interface screen or the second user interface screen. The user (operator) can easily select whether to display the first user interface screen or the second user interface screen on the third user interface screen.

Further, in the present technology, for example, the GUI control unit may receive a selection operation of a video file on the first interface screen, and transmit, to the clip storage unit, a control command to control the clip storage unit to perform video output of this video file, and may receive a selection operation of a video file on the second user interface screen, and transmit, to the video server, a control command to perform video output of this video file. The user (operator) can easily perform an operation of performing video output of the video file of the clip storage unit or an operation of performing video output of the video file of the video server.

Further, in the present technology, for example, the video signal generation circuit may include a video circuit for outputting a video file as a video signal, and the GUI control unit may receive a load operation of a video file on the first user interface screen, and transmit, to the clip storage unit, a load command to load this video file from the file storage into the video circuit. The user (operator) can easily perform an operation of loading the video file from the file storage into the memory circuit at the clip storage unit.

In this case, the GUI control unit may change display of the loaded video file on the first user interface screen to indicate that the video file has been loaded. The user (operator) is enabled to check that the video file has been loaded.

Further, in the present technology, the video server may include a video circuit for outputting a video file as a video signal, and the GUI control unit may receive a load operation of a video file on the second user interface screen, and transmit, to the video server, a load command to partially or entirely load this video file from the file storage to the video circuit. The user (operator) can easily perform an operation of loading the video file from the file storage into the memory circuit at the video server.

In this case, the GUI control unit may change display of the loaded video file on the second user interface screen to indicate that the video file has been loaded. The user (operator) is enabled to check that the video file has been loaded.

Further, in the present technology, for example, the GUI control unit may receive a transfer operation of a video file on the second user interface screen, and transmit, to the video server, a transfer command to transfer this video file to the clip storage unit. The user (operator) can easily perform a transfer operation of the video file from the video server to the clip storage unit.

Advantageous Effects of Invention

In accordance with the present technology, it is possible to provide a user with an effect switcher and a switcher system having improved usability. Note that the effects described here are not necessarily limitative and any effect described in the present disclosure may be provided.

BRIEF DESCRIPTION OF DRAWINGS

FIG. 4 A diagram for describing a storage location of video clip files, file transfer, video transmission, and the like.

FIG. 10 A diagram showing an example of an editing screen of the table 2, which is one of GUI screens in a control panel.

FIG. 11 A diagram showing a state in which a scroll operation is performed on "Input Selection" of a right-hand table of the editing screen.

FIG. 12 A diagram showing another display example of "Input Selection" of the right-hand table of the editing screen.

FIG. 13 A diagram showing an example of an output assign table for determining which signal of an internal circuit is output to each of output terminals (SDI connector and optical connector) of the vision mixer main frame.

FIG. 14 A diagram showing an example of an editing screen of the output assign table, which is one of the GUI screens in the control panel.

FIG. 15 A diagram showing another example of the editing screen of the output assign table.

FIG. 20 A diagram for describing a screen (GUI screen) that can be displayed and operated on the control panel or the GUI panel.

MODE(S) FOR CARRYING OUT THE INVENTION

Hereinafter, a mode for carrying out the invention (hereinafter, referred to as "embodiment") will be described. Note that descriptions will be made in the following order.
1. Embodiment
2. Modified Example
3. Application Example 1. Embodiment

[Configuration of Broadcasting System]

Figure 1:
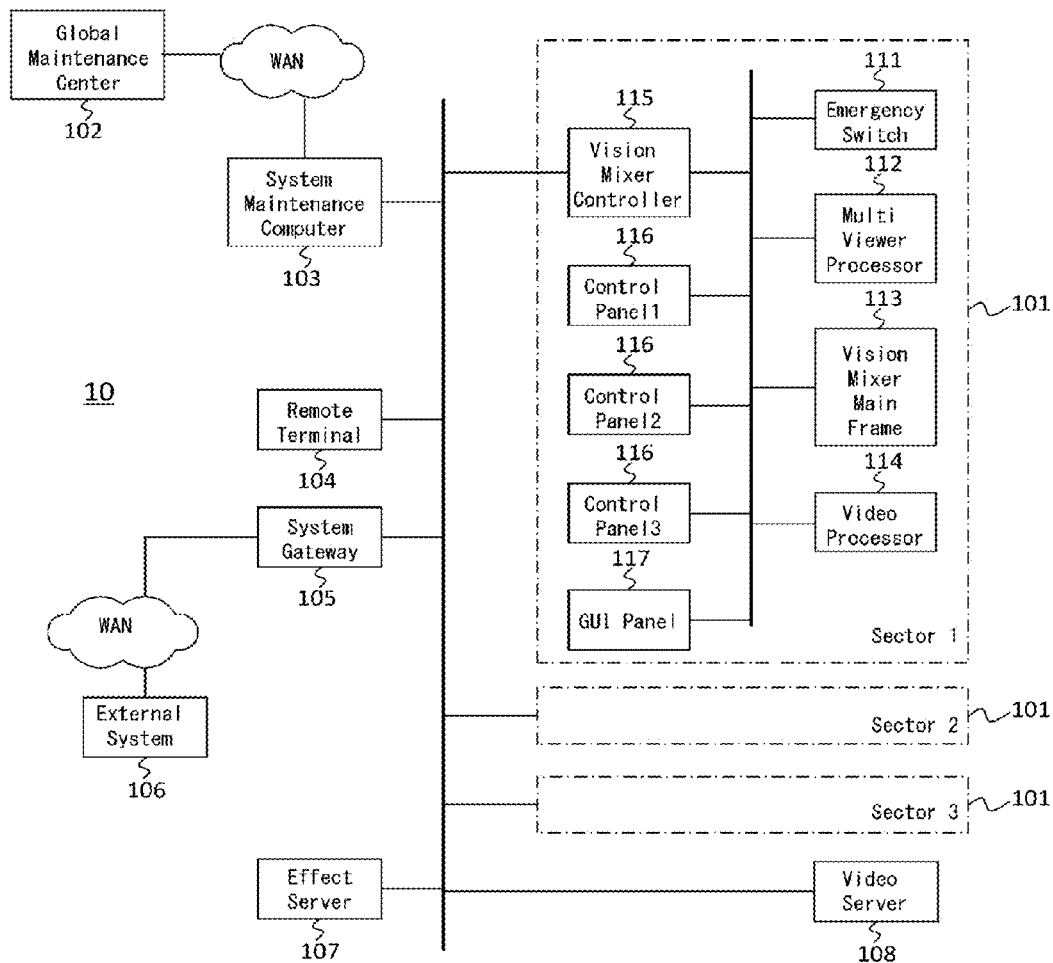
FIG. 1 A block diagram showing a configuration example of a broadcasting system including apparatuses and the like in a broadcast station.

FIG. 1 shows a configuration example of a broadcasting system 10 including apparatuses and the like in a broadcast station. In the example shown in the figure, a control system and a file transfer system are mainly shown. Connection lines indicate networks. This broadcasting system 10 includes a plurality of, in this embodiment, three sectors 101, a global maintenance center 102, a system maintenance computer 103, a remote terminal 104, a system gateway 105, an external system 106, an effect server 107, a video server 108, and the like.

Each of the sectors 101 is, for example, a partial system corresponding to a combination of a studio and a control room thereof. Apparatuses outside the sectors 101 are, for example, apparatuses to be commonly used in the respective studios.

The global maintenance center 102 is a remote maintenance center outside the buildings, and communicates with the apparatuses in the broadcast station via a WAN (Wide Area Network). This global maintenance center 102 constantly monitors operation states, logs, error information, and the like of the respective apparatuses. The system maintenance computer 103 is a computer that monitors the apparatuses in the broadcast station, and records the logs of the operation states and the like, monitors errors and makes notification about them, communicates with the global maintenance center 102, and so on.

Each of the sectors 101 includes an emergency switch 111, a multi viewer processor 112, a vision mixer main frame 113, a video processor 114, a vision mixer controller 115, control panels 116, and a GUI panel 117.

The vision mixer controller 115 communicates with a microcomputer in the vision mixer main frame 113 that constitutes an effect switcher main body, and performs control. Further, the vision mixer controller 115 also communicates with built-in microcomputers of the emergency switch 111, the multi viewer processor 112, and the video processor 114, and performs control.

Each of the control panels 116 is an operation unit including a physical operation table and a UI of GUIs. A built-in microcomputer thereof communicates with the vision mixer controller 115 and performs transmission and reception and the like of control commands. Further, the built-in microcomputer thereof communicates with the emergency switch 111 and directly controls the emergency switch 111. The GUI panel 117 includes only a UI of GUIs, and provides some of functions of the control panel 116.

Note that the control panel 116 is connected to the video server 108 through the vision mixer controller 115 via the network, and also controls this video server 108.

The emergency switch 111 performs only switching between video signals. This emergency switch 111 includes an SDI input for a plurality of video signals and an SDI output for a plurality of video signals. Note that this emergency switch 111 may include an interface (I/F) for IP video transmission. The switching between video signals in this emergency switch 111 is performed at a vertical blanking interval (boundary between frames or fields). Thus, even when an output video is displayed, the image is not disturbed.

The remote terminal 104 is a terminal apparatus that communicates with the system maintenance computer 103, the vision mixer controller 115, the effect server 107, the video server 108, and the like, and provides a UI. The effect server 107 is a server that retains a plurality of programs (including time-series processing) describing the processing contents of video signal processing (switching, combining, processing) to be performed by the vision mixer main frame 113. The effect server 107 provides the programs to the vision mixer controller 115 of each sector 101. The contents of the program are a video signal processing state and time-series operations that operate in a well-known effect switcher.

The system gateway 105 is connected to the WAN and communicates with the external system 106. The system gateway 105 transmits and receives video clip files and programs, for example. The video server 108 transmits and receives the video clip files to/from the vision mixer controller 115 via the network. Further, the video server 108 receives instructions from the vision mixer controller 115 and the like. The control panel 116 receives a user's operation, and transmits an instruction to the video server 108 via the vision mixer controller 115. Further, the control panel 116 receives and displays information about a file list and the like of the video server 108 via the vision mixer controller 115.

Figure 2:
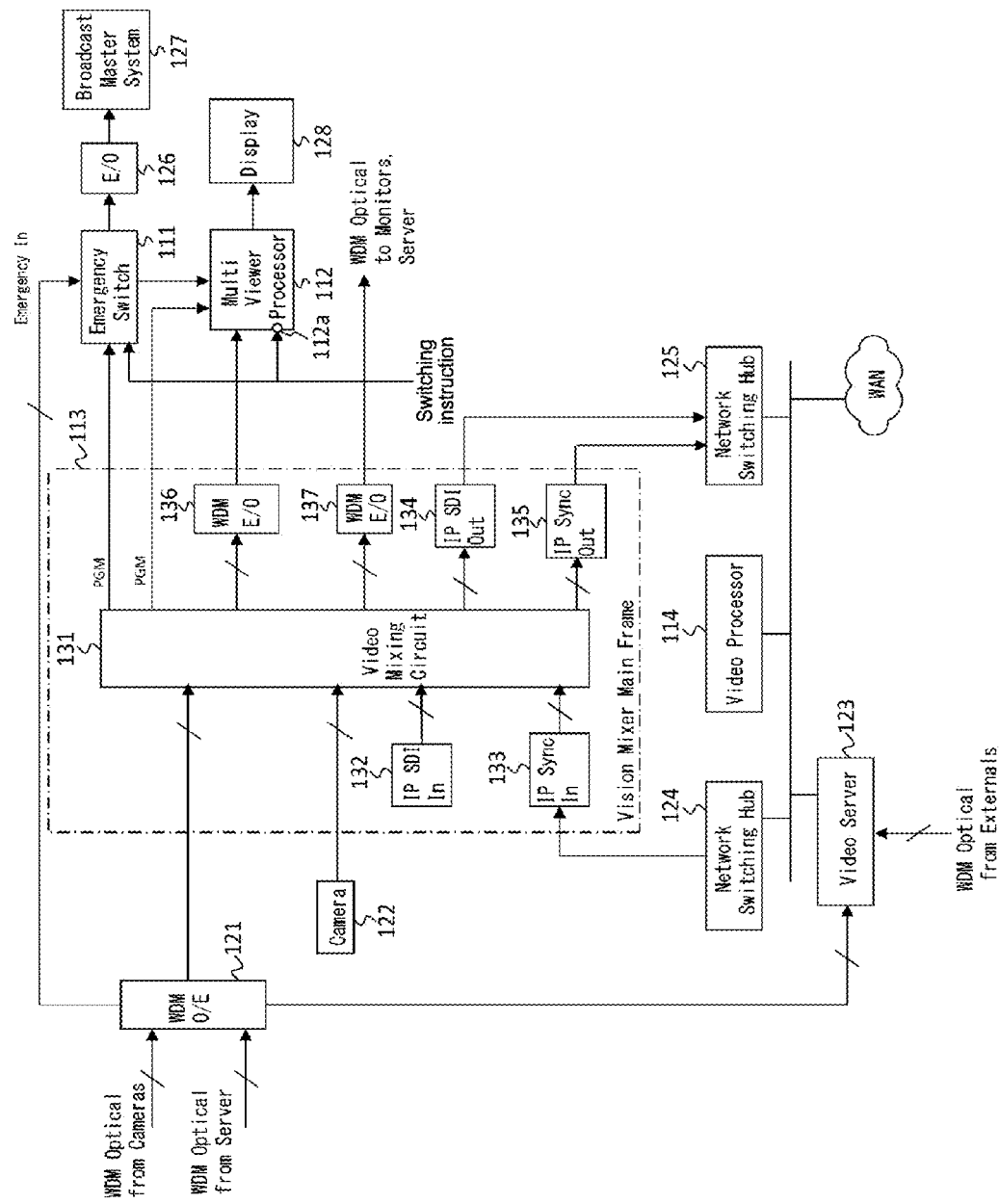
FIG. 2 A block diagram showing an connection example of a video signal system in a sector.

FIG. 2 shows a connection example of a video signal system in the above-mentioned sector 101. The vision mixer main frame 113, the emergency switch 111, and the video processor 114, which are described above, exist in this connection example of the video signal system.

Further, in this connection example of the video signal system, there are a WDM optical-to-electrical converter (WDM O/E) 121, a camera 122, a video server 123, network switching hubs 124 and 125, an electrical-to-optical converter (E/O) 126, a broadcast master system 127, and a display 128.

Further, the vision mixer main frame 113 includes a video mixing circuit 131 and also includes an IP-SDI input unit (IP SDI In) 132, an IP-Sync input unit (IP Sync In) 133, an IP-SDI output unit (IP SDI Out) 134, an IP-Sync output unit (IP Sync In) 135, and WDM electrical-to-optical converters (WDM O/E) 136 and 137.

The WDM optical-to-electrical converter 121 receives optical signals (wavelength division multiplex signals) transmitted from the server, the camera, and the like, converts them into a plurality of electrical SDI video signals, and supplies them to the video mixing circuit 131 of the video mixer main frame 113, the emergency switch 111, the video server 123, and the like. The camera 122 is an external camera, and supplies the SDI video signals to the video mixing circuit 131 of the video mixer main frame 113.

The network switching hubs 124 and 125 are apparatuses that perform relay of the networks (e.g., 10GBASE-T and 10GBASE-SR). The video server 123 is a server that retains video clips (files). This video server 123 includes a network interface (Network I/F) and also includes input and output terminals for SDI video signals.

The video processor 114 is an apparatus that processes video signals and generates computer graphics images. This video processor 114 includes a network interface (Network I/F) and also includes input and output terminals for SDI video signals. The network to which the video server 123 and the video processor 114 are connected is externally connected via the WAN for video clip transmission and the like.

The emergency switch 111 is a switching apparatus of a video signal for emergency. The emergency switch 111 receives input of a plurality of video signals as "Emergency In" from the WDM optical-to-electrical converter 121, and receives PGM video signals from the video mixing circuit 131 of the vision mixer main frame 113.

Normally, the emergency switch 111 outputs video signals from the video mixing circuit 131. The emergency switch 111 supplies these video signals to the multi viewer processor 112. At the same time, the emergency switch 111 converts them from electrical signals to optical signals in the electrical-to-optical converter 126 and supplies them to the broadcast master system 127.

On the other hand, in case of emergency, the emergency switch 111 receives an "emergency (mode) instruction" from the vision mixer controller 115, the control panel 116 (see FIG. 1), or the like. Then, the emergency switch 111 selects and outputs one of a plurality of video signals input as "Emergency In". The emergency switch 111 supplies this video signal to the multi viewer processor 112. At the same time, the emergency switch 111 converts it from an electrical signal into an optical signal at the electrical-to-optical converter 126, and supplies it to the broadcast master system 127. Selecting one from among the plurality of video signals input as "Emergency In" depends on a command from the vision mixer controller 115, the control panel 116, or the like.

The broadcast master system 127 is a system that supplies video signals to a broadcast radio wave output. The multi viewer processor 112 receives a plurality of video signals, and supplies the video signals such that multiple video image frames is displayed by the display 128 having a large screen and a high resolution. Regarding how to arrange the plurality of input video signals on the screen, the multi viewer processor 112 stores settings therefor and performs processing in accordance with them.

The multi viewer processor 112 receives output video signals from the emergency switch 111. Further, the multi viewer processor 112 receives PGM video signals from the video mixing circuit 131 of the vision mixer main frame 113. In addition, the multi viewer processor 112 receives optical signals including a plurality of video signals from the vision mixer main frame 113. Note that the video signals included in the optical signals may include the PGM video signals.

The vision mixer main frame 113 constitutes the effect switcher main body. The IP-SDI input unit 132 receives an IP packet sequence of SDI video signals input through the network, depacketizes it, extracts the SDI video signals, and supplies them to the video mixing circuit 131.

The IP-Sync input unit 133 receives an IP packet sequence of video signals synchronized with a reference input through the network, depacketizes it, extracts the video signals synchronized with the reference, and supplies them to the video mixing circuit 131.

As described above, the reference signal is supplied via the network. The vision mixer main frame 113, and thus, the video mixing circuit 131 operate in synchronization with this reference signal. Note that the vision mixer main frame 113 may be supplied with the reference signal through an additional wire.

The video mixing circuit 131 is a signal processing functional part that includes input and output for electrical video signals, and performs switching, combining processing, and the like of the video signals. This video mixing circuit 131 will be described later in detail.

The WDM electrical-to-optical converters 136 and 137 convert electrical SDI video signals, which are output from the video mixing circuit 131, into optical signals (wavelength division multiplex signals). The WDM electrical-to-optical converter 136 supplies the obtained optical signals to the multi viewer processor 112 through an optical connector (e.g., QSFP+) of the vision mixer main frame 113. Further, the WDM electrical-to-optical converter 137 supplies the obtained optical signals to a monitor (display device) and the server through the optical connector of the vision mixer main frame 113.

The IP-SDI output unit 134 converts the SDI video signals output from the video mixing circuit 131 into an IP packet sequence and outputs it to the network. The IP-Sync output unit 135 converts the SDI video signals output from the video mixing circuit 131 into an IP packet sequence synchronized with the reference, and outputs it to the network.

Figure 3:
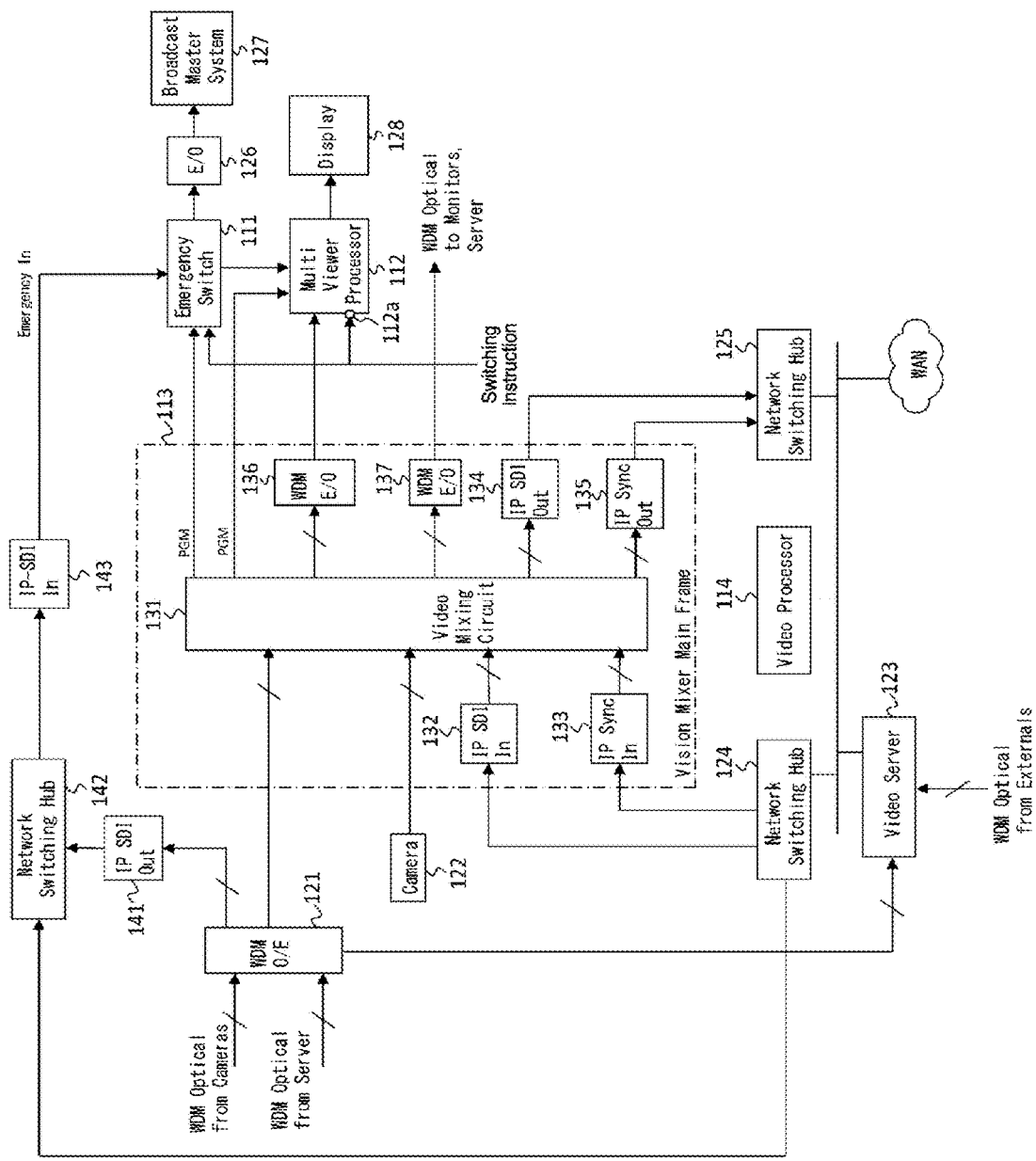
FIG. 3 A block diagram showing another connection example of the video signal system in the sector.

FIG. 3 shows another connection example of the video signal system in the above-mentioned sector 101. In FIG. 3, portions corresponding to those of FIG. 2 will be denoted by identical reference signs, and descriptions thereof will be omitted. In this connection example of the video signal system, there are an IP-SDI output unit (IP SDI Out) 141, a network switching hub 142, and an IP-SDI input unit (IP SDI In) 143.

The IP-SDI output unit (IP SDI Out) 141 converts the plurality of electrical SDI video signals, which are obtained in the WDM optical-to-electrical converter 121, into an IP packet sequence, and outputs it to the network. The IP-SDI input unit 143 is controlled by the vision mixer controller 115, the control panel 116 (see FIG. 1), or the like, receives one IP packet sequence of SDI video signals from the network, depacketizes it, extracts the SDI video signals, and supplies them to the emergency switch 111.

Figure 4:
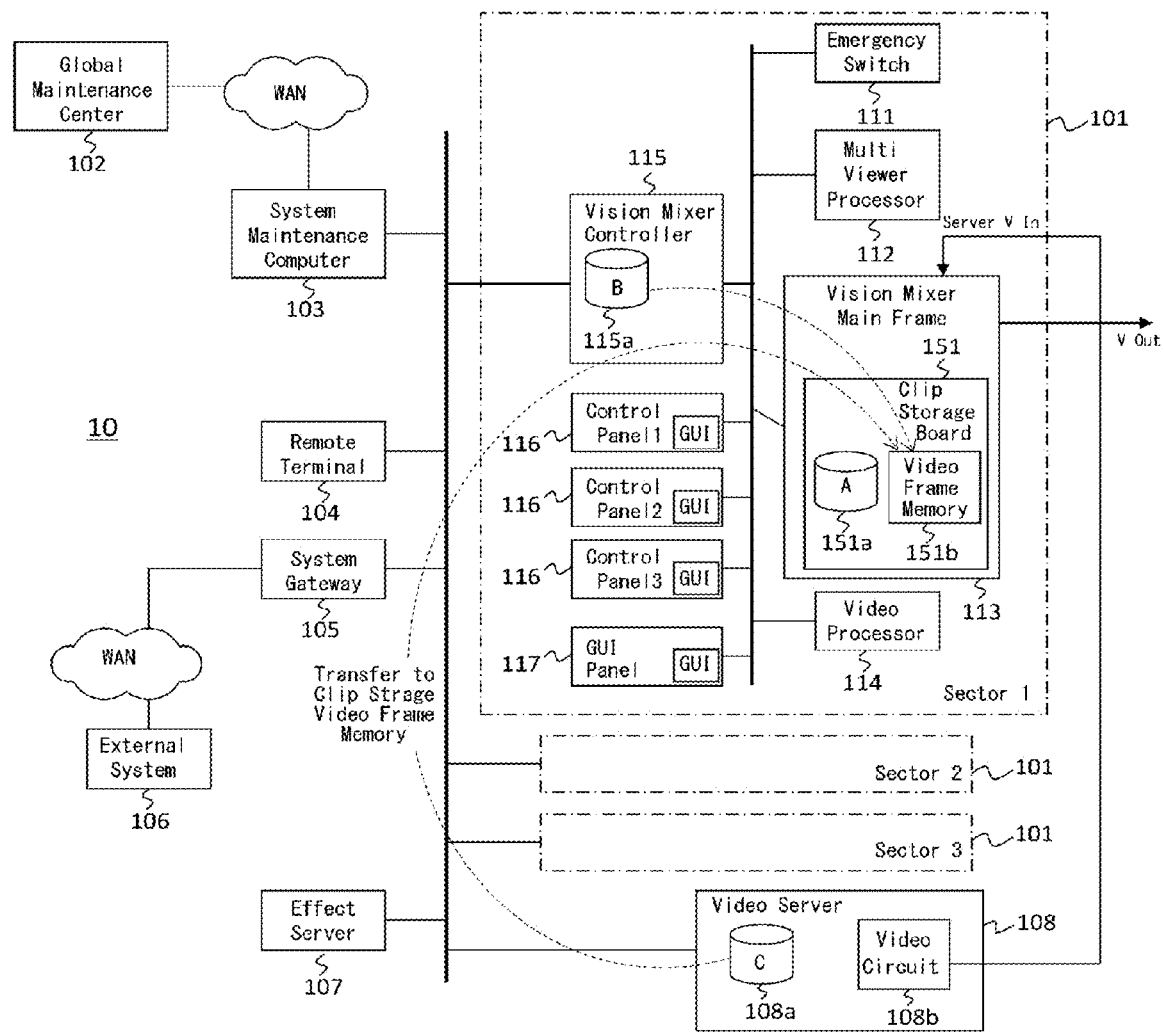

A storage location of video clip files, file transfer, video transmission, and the like will be described with reference to FIG. 4. In FIG. 4, portions corresponding to those of FIG. 1 are denoted by identical reference signs. In the vision mixer main frame 113, there is a clip storage board 151. This clip storage board 151 includes storage (A) 151*a* and a video frame memory 151*b*.

The storage (A) 151*a* includes an HDD (hard disk drive) or an SSD (solid state drive). The video frame memory 151*b* is a memory that retains video clips. The video clips retained in the clip storage board 151 are output as video signals.

Figure 5:
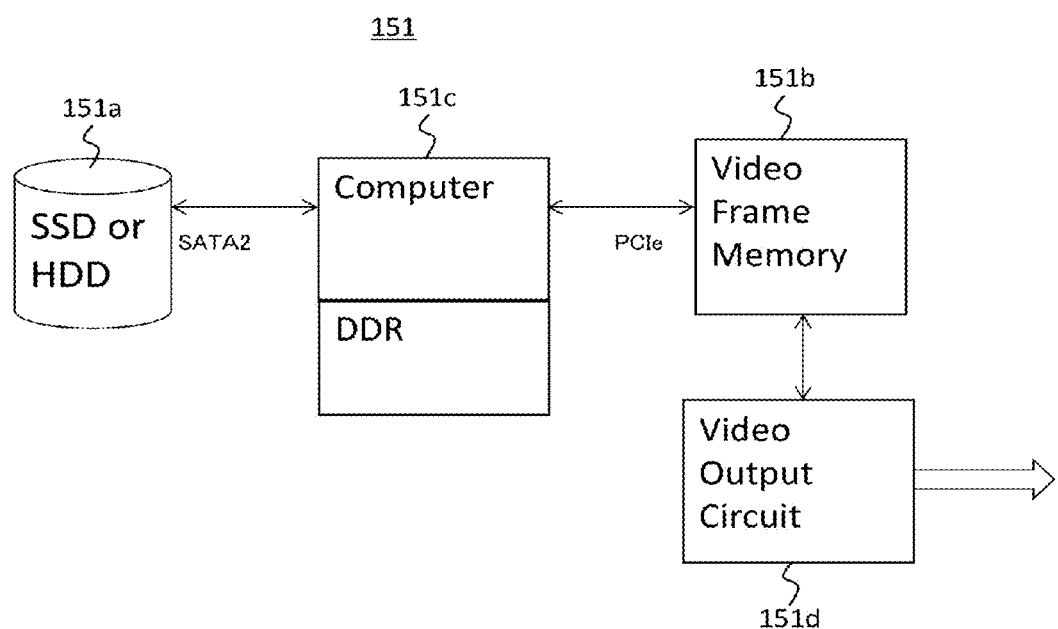
FIG. 5 A block diagram showing a configuration example of a clip storage board.

FIG. 5 shows a configuration example of the clip storage board 151. The clip storage board 151 includes a microcomputer (Computer) 151*c* and a video output circuit 151*d* besides the storage 151*a* and the video frame memory 151*b*, which are described above.

The microcomputer 151*c* controls operations of the respective units of the clip storage board 151, and employs, for example, a DDR (Double Data Rate) method having a high data processing efficiency for a memory. The microcomputer 151c and the storage 151a are connected through SATA2 (Serial ATA 2.0), for example.

Further, the microcomputer 151c and the video frame memory 151b are connected through PCIe (PCI Express), for example. The video clips retained in the video frame memory 151b are output from the video output circuit 151d as the video signals.

The microcomputer 151c of the clip storage board 151 writes a video clip (still image, i.e., data of one frame or moving image, i.e., data of a frame sequence), which is read from the storage (A) 151a, in the video frame memory 151b. The microcomputer 151c of the clip storage board 151 receives an instruction from the vision mixer controller 115, and outputs video signals of the still image or the moving image from this video frame memory 151b in synchronization with the reference signal.

Further, the microcomputer 151c of the clip storage board 151 receives video clips externally transferred, and writes them in the storage (A) 151a. Further, the microcomputer 151c of the clip storage board 151 reads the retained contents of the video clips of the storage (A) 151a, and externally transmits a list of the video clips or externally transfers the video clips.

The vision mixer controller 115 includes storage (B) 115a including an HDD or an SSD, and transmits and receives video clips (video files) to/from the clip storage board 151, the video server 108, and the like. The vision mixer controller 115 controls the vision mixer main frame 113 and also controls the clip storage board 151 included therein.

The video server 108 includes storage (C) 108a including an HDD or an SSD, and a video circuit 108b. The video circuit 108b is a circuit that outputs video clips in the storage (C) 108a as video signals. For outputting the video clips as the video signals, the video circuit 108b receives a preparation instruction in advance and prepares for continuously outputting them as the video signals, and starts, after preparation, video signal output without delay for a next coming output start command. Such preparation is well-known as a video server technology.

The video server 108 receives an instruction from the vision mixer controller 115 or the like, and transmits video clips (video files) retained in the storage (C) 108a and the list thereof to the vision mixer controller 115 or the like or inversely receives them.

The vision mixer controller 115 writes the received video files in the storage (B) 115a or causes the storage (A) 151a of the clip storage board 151 to write them. In this case, an operation of writing them only in the video frame memory 151b without writing them in the storage (A) 151a is also possible. It depends on an operator's operation and previous settings.

The SDI video signals output from the video circuit 108b of the video server 108 may enter the vision mixer main frame 113 as an input and may be used. The vision mixer main frame 113 externally outputs video signals based on the input video signals or video signals based on video signals generated inside the clip storage board 151 or the like.

Figure 6:
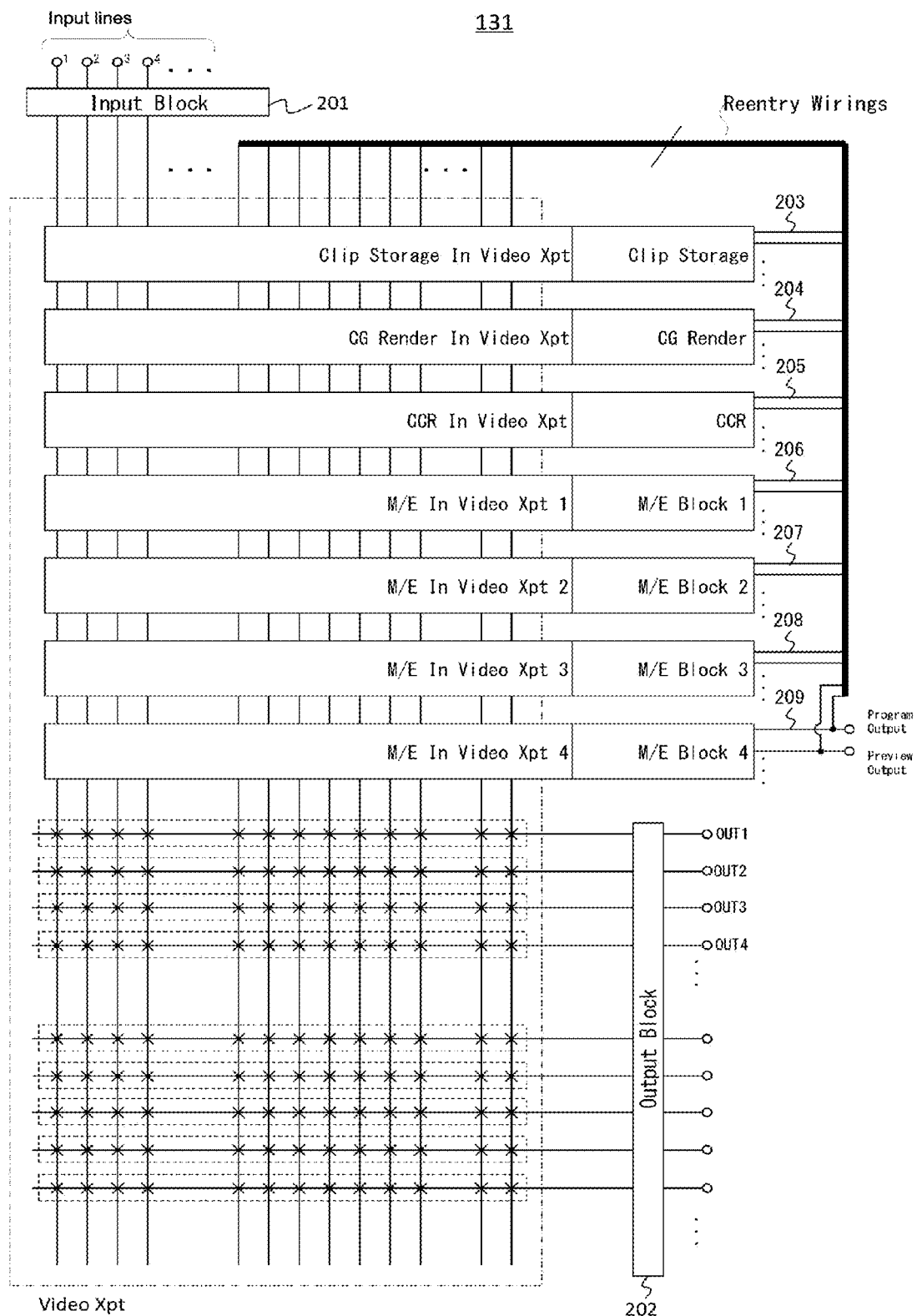
FIG. 6 A block diagram showing an inside of a video mixing circuit of a vision mixer main frame in the video signal system.

FIG. 6 is a block diagram showing an inside of the video mixing circuit 131 of the vision mixer main frame 113 (see FIGS. 2 and 3) in the video signal system. An input block 201 is a portion that receives video signals from the camera 122 and video signals obtained by the WDM optical-to-electrical converter 121, the IP-SDI input unit 132, the IP-Sync input unit 133, and the like. It collectively shows a circuit that adjusts delays of video signals, a circuit that converts them into an internal format, and the like.

An output block 202 is a portion that outputs video signals to be supplied to the WDM electrical-to-optical converters 136 and 137, the IP-SDI output unit 134, the IP-Sync output unit 135, and the like. It collectively shows a circuit that adjusts delays of video signals, a circuit that adds ancillary information, a circuit that performs format conversion, and the like.

A portion surrounded by the long dashed short dashed line indicates a video cross point (Video Xpt). In the state shown in the figure, video signals supplied from an upper side are shown by vertical lines and video signals supplied to a left-hand side are shown by horizontal lines. There are marks "x" at portions at which the horizontal lines overlap the vertical lines. These marks "x" indicate selectable cross points. Each of the horizontal lines, i.e., internal buses has a selection function of selecting and receiving an input video signal shown by any one of the vertical lines (see horizontally-long broken-line frames).

Note that, regarding the rectangles of "ClipStorage In Video Xpt", "CG Render In Video Xpt", "CCR In Video Xpt", and "M/E In Video Xpt 1" to "M/E In Video Xpt 4", although insides thereof are not shown in the figure, there are a plurality of internal buses and each of the internal buses is controlled to receive any one input video signal. These are controlled by the microcomputer in the vision mixer main frame 113 and/or by the computer of the vision mixer controller 115.

"ClipStorage" corresponds to the above-mentioned clip storage board 151, stores video signals supplied through the internal bus from "ClipStorage In Video Xpt", and outputs the stored video frame (single video frame or video frame sequence) from a plurality of output buses 203.

"CG Render" is a circuit that performs computer graphics processing, utilizes video signals supplied through the internal bus from "CG Render In Video Xpt" to generate computer-graphics video signals in synchronization with the reference signal, and outputs them to a plurality of output buses 204.

"CCR" is a color collection circuit. "CCR" performs color adjustment on video signals supplied through the internal bus from "CCR In Video Xpt", and outputs them through a plurality of output buses 205. A delay in this "CCR" is shorter than the time of one scan line.

"M/E Block 1" to "M/E Block 4" process video signals supplied through the internal buses from "M/E In Video Xpt 1" to "M/E In Video Xpt 4", respectively, and output them through a plurality of output buses 206 to 209. The M/E blocks ("M/E Block 1" to "M/E Block 4") will be described later in detail.

"Reentry Wirings" collectively indicate circuit structures for linking a plurality of video signals (partially not shown in the figure) from the blocks of the respective output buses 203 to 209 as inputs into the video cross point. OUT1, OUT2, . . . indicate external output ports, each of which is a line for outputting video signals. At the subsequent stage at which the video signals are converted into optical signals, the plurality of output lines are put together.

Figure 7:
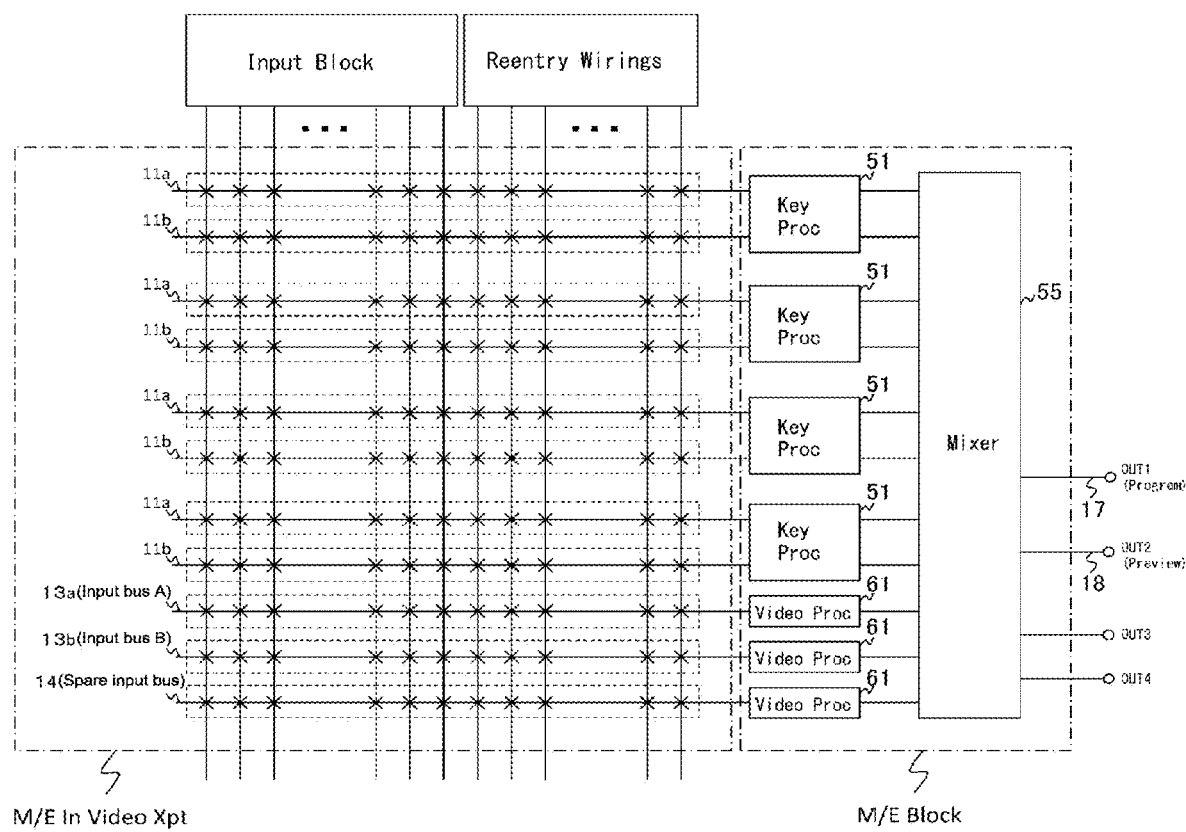
FIG. 7 A diagram showing a configuration example of an M/E bank.

FIG. 7 shows a configuration example of an M/E bank. The M/E bank includes the video cross point (M/E In Video Xpt) and the M/E block. The M/E block is a circuit block that performs image composition. This M/E block includes a plurality of key processors (key image-processing units), here, four key processors 51, a mixer (combining processing unit) 55, and a plurality of video processors (video-processing units), here, three video processors 61. The key processors 51 and the mixer 55 constitute a superimpose circuit.

The video cross point is an input selector, and selectively supplies each of the input video signals to each of four pairs of key source bus 11a and key fill bus 11b, a background A bus 13a, a background B bus 13b, and a spare input bus 14. Key fill signals of the key fill bus 11b are signals of an image to be superimposed on a background image as the foreground. Key source signals of the key source bus 11a are signals for designating a region on which the key fill signals are superimposed, a shape in which the background image is cut off, density of the key fill signals to the background image, and the like.

Background A signals extracted by the background A bus 13a are transmitted to the mixer 55 via one of the video processors 61. Further, background B signals extracted by the background B bus 13b are transmitted to the mixer 55 via one of the video processors 61. Further, spare input signals extracted by the spare input bus 14 are transmitted to the mixer 55 via one of the video processors 61.

Each of the key processors 51 is a circuit that adjusts and processes the key fill signals and the key source signals on a basis of key adjustment values that are various parameters for performing keying, such that these are suitable for keying. The key adjustment values are values as follows. That is, these include a value for adjusting the density of the key fill signals to the background image, a value for adjusting a threshold of a signal level of the image that should be considered as a key source signal, a value for adjusting a position of the key source signal, a value for adjusting a reduction ratio of the key fill signal, an adjustment value regarding a boundary line with the background image, and the like.

The key fill signals and the source signals adjusted and processed by the key processor 51 are transmitted to the mixer 55. The mixer 55 is a circuit that superimposes a foreground image on the background image by keying, using the key fill signals and the key source signals from the key processor 51. Further, the mixer 55 combines the background A signals passing each of the video processors 61 and the background B signals passing each of the video processors 61 to generate a background image. The mixer 55 is capable of using a wipe and the like for this combining. The mixer 55 has a function of performing switching transition of the background image by using a wipe and the like.

A program output is externally output from this mixer 55 through a program output line 17. Further, a preview output is externally output from this mixer 55 through a preview output line 18. Although the mixer 55 is shown in the figure as having four output systems, a larger number of signals can be output from the mixer 55, and which signal is selected and output from the mixer is determined by additional setting. Here, setting is made such that at least a Program (main video signal as the result of combining) and a preview are output.

Note that a configuration in which each signal processing function of the M/E bank is realized by computer software may be employed.

Figures 8, 9:
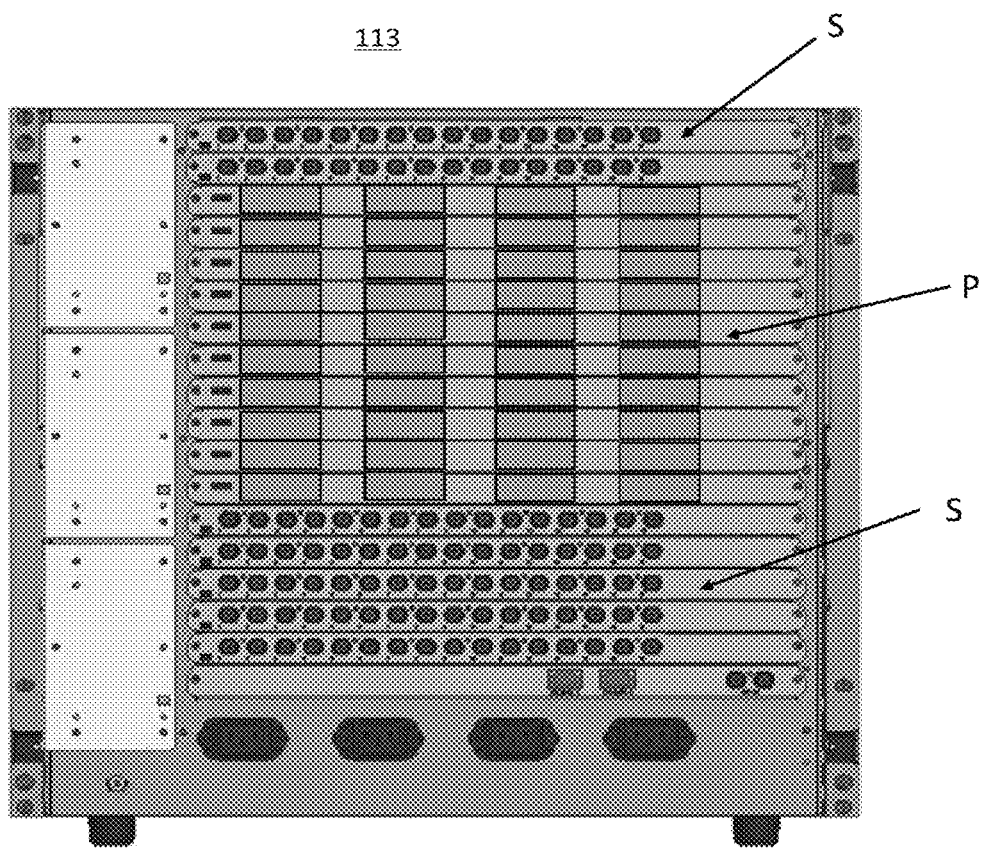
FIG. 8 A diagram showing an example of a casing back surface of the vision mixer main frame.
FIG. 9 A diagram showing an example of input assign tables (table 1 and table 2) in the M/E block.

FIG. 8 is a diagram showing an example of a casing back surface of the vision mixer main frame 113. A plurality of SDI connectors are arranged on the casing back surface of the vision mixer main frame 113 as shown by the arrow S. Further, a plurality of optical connectors (e.g., QSFP+) are arranged on this casing back surface of the vision mixer main frame 113 as shown by the arrow P.

Next, the input assign table will be described. This input assign table is a table for determining an input video signal selected when a button for a cross-point button sequence in each internal bus, which is provided in an operator console of the control panel 116 (see FIG. 4), is pressed. As shown in FIG. 9, the input assign table includes two tables of "table 1" and "table 2" in this embodiment.

In the "table 1", a button number of each button of a button sequence is made to correspond to an index dedicated to this function. In the "table 2", the index is made to correspond to an input number for a key fill signal (V) and an input number for a key source signal (K). Due to these two tables, an operation regarding which input signal is selected is determined when a certain button of the crosspoint button sequence, which corresponds to a certain internal bus, is operated. Note that the input number for the key fill signal is used in the background A bus 13a, the background B bus 13b, and the spare input bus 14 unless there is a special change instruction.

Figures 10, 11:
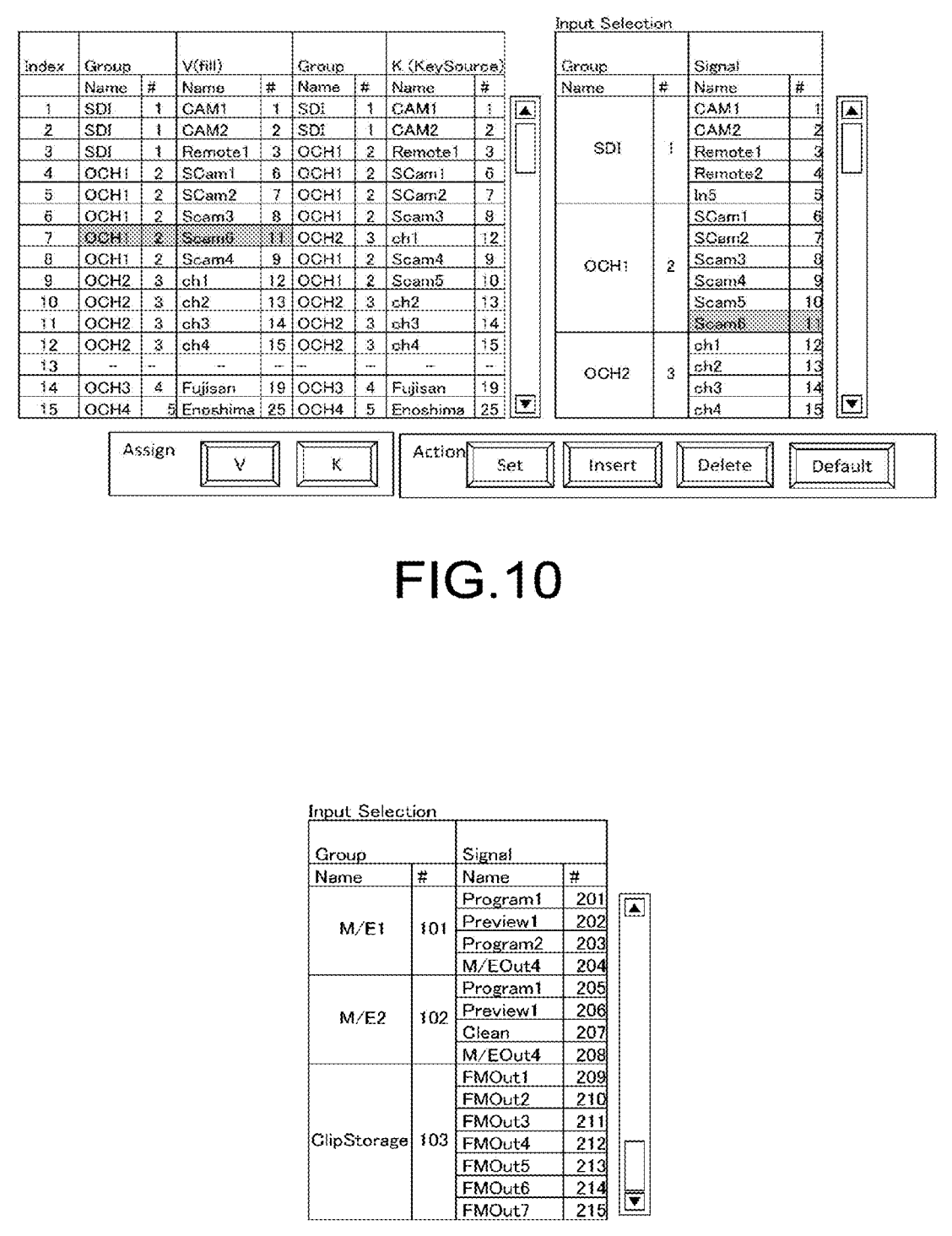

FIG. 10 shows an example of an editing screen of the table 2 as one of the GUI screens in the control panel 116. Note that an illustration of the editing screen of the "table 1" and a description thereof are omitted here.

Regarding each input number, a name thereof, and a group number and a name of a group to which it belongs are additionally stored in the control panel 116. Here, the group includes a group determined in a manner that depends on the hardware configuration of the vision mixer main frame 113 and a group determined by additional setting.

Each of groups having names "OCH1", "OCH2", and "OCH3" in the figure corresponds to the optical connector of the casing back surface of the vision mixer main frame 113, which is an optical communication path. An input number(s) belonging to it corresponds to a video signal input by the corresponding one optical connector. The name of the group can be set by an operator's operation on an additional setting screen.

Further, a group having the name "SDI" in the figure corresponds to the plurality of SDI connectors of the casing back surface of the vision mixer main frame 113, and an input number belonging to it corresponds to a video signal input by the SDI connector. This input number belonging to the SDI group can be changed by using another setting screen.

In the editing screen of FIG. 10, the left-hand table displays the contents of the "table 2". In the column, an index, a group name of the key fill signal (V), a group number of the key fill signal (V), a name of the key fill signal (V), an input number of the key fill signal (V), a group name of the key source signal (K), a group number of the key source signal (K), a name of the key source signal (K), and an input number of the key source signal (K) are arranged from the left.

Further, on the editing screen of FIG. 10, the right-hand table is "Input Selection", and options of input signals selectable as the key fill signal (V) or the key source signal (K) are enumerated. In the column, a group name, a group number, a name of the input signal, and an input number of the input signal are arranged from the left.

An example of an editing operation sequence using the editing screen as shown in FIG. 10 will be described. The operator selects any of the rows of the left-hand table by a selection operation that is a click or the like on the editing screen. In the example shown in the figure, a state in which a part on a side of the key fill signal (V) in an index 7 is selected is shown.

A V/K button of "Assign" is for operation according to a radio button method with two options. When "V" is pressed (clicked), a V column in the row of the left-hand table is selected, and becomes a setting change target. On the other hand, when "K" is pressed (clicked), a K column in the row of the left-hand table is selected, and becomes a setting change target.

When the operator performs an operation of selecting any row of "Input Selection", a display mode changes there. In the example shown in the figure, an input signal with the name "Scam6" and the input number "11" is selected. When the operator presses "Set" of "Action", a position (either one of the V column and the K column) selected in the left-hand table is the input signal selected in "Input Selection".

Further, when the operator presses "Insert" of "Action", all the contents of the left-hand table, which are located below the currently selected row, downwardly move by one row with respect to the index. Then, the preceding row (row of the index 7 under the state shown in the figure) is put in an unset state. This unset state refers to the display as in the index 13 as shown in the figure, and portions other than the index become horizontal lines and indicate that anything is not set. Even if a button corresponding to this unset state is pressed, anything does not happen, and the M/E block, and thus, the vision mixer main frame 113 are kept in the state immediately before it.

Further, when the operator presses "Delete" of "Action", the currently selected row of the left-hand table is put in the unset state. Further, when the operator presses "Default" of "Action", the currently selected row of the left-hand table is put in a default state. The default state is a state stored in advance in the vision mixer controller 115, and is, for example, a state in which an input signal having the same input number as the index number is set in both of V and K.

Note that, although it is different from the example shown in the figure, an operation button of, for example, setting the input signal in the group selected in "Input Selection" in a plurality of rows starting from the row selected in the left-hand table may be further provided.

FIG. 11 shows a state in which a scroll operation is performed in "Input Selection" of the right-hand table of the editing screen shown in FIG. 10. In "Input Selection" of FIG. 10, external input signals are enumerated as the options. In contrast, here, output signals of an internal circuit (signals passing Reentry Wirings) are enumerated as options. For example, outputs of the M/E block are all enumerated as the options.

In the example shown in the figure, outputs from the M/E block are enumerated with the group names corresponding to "M/E 1" and "M/E 2". Each M/E block includes four outputs. Although meanings of the respective outputs differ in a manner that depends on settings of the M/E blocks, it is here assumed that these are signals each having the displayed name. A first output of the M/E block 1 (M/E 1) is "Program1" (regular output). A second output is "Preview1". A third output is "Program2 (second regular output)". A fourth output is a partially combined video signal other than them, whose name is unset. Also regarding the M/E block 2 (M/E 2), options depending on settings are displayed.

Outputs from "ClipStorage" are enumerated with the group name corresponding to "ClipStorage". These can also be assigned to the buttons of the cross-point button sequence.

FIG. 12 shows another display example of "Input Selection" of the right-hand table of the editing screen. The fact that a valid signal has not come in a channel for a sixth video signal of the "OCH1" group is detected in the Input Block, for example. Therefore, it is blank.

On the editing screen of FIG. 10, immediately after the contents of the left-hand table are updated, the contents thereof are stored as the "table 2". Note that a plurality of tables may be stored as the "table 2" such that the "table 2" to be used can be designated in a manner that depends on internal buses to be applied or operator's operation cases. Further, the names of the respective input signals can be edited through an additional screen.

Next, the output assign table will be described. FIG. 13 shows an example of the output assign table. This output assign table is a table for determining which signal of the internal circuit is output to each of output terminals (SDI connector and optical connector) arranged on the casing back surface of the vision mixer main frame 113. This output assign table is stored by the vision mixer controller 115 and the vision mixer main frame 113 is controlled by it.

FIG. 14 shows an example of the editing screen of the output assign table as one of the GUI screens in the control panel 116. Internal signal numbers are respectively added to the output signals of the internal circuit. Further, names are respectively added to those output signals.

In the editing screen of FIG. 14, the left-hand table displays the contents of the output assign table. In the column, a name as a group of output terminals, a group number, an output port number given to a channel of each output video signal, a name of the output signal of the internal circuit, which is assigned, and an internal signal number thereof are arranged from the left. Further, on the editing screen of FIG. 14, the right-hand table is "Internal Signal Selection", and the name and the number of the output signal of the internal circuit are displayed as options.

An example of the editing operation sequence using the editing screen of FIG. 14 will be described. The operator selects any of the rows of the left-hand table by a selection operation that is a click or the like on the editing screen. In the example shown in the figure, a state in which an output port number 11 is selected is shown. Next, the operator performs an operation of selecting any row of "Internal Signal Selection". Then, a display mode changes there. In the example shown in the figure, the output signal of the internal circuit with the internal signal number "9" and the name "FMO1" is selected. When the operator presses "Set" of "Action", the output signal of the internal circuit, which is selected in "Internal Signal Selection", is overwritten in the row selected in the left-hand table.

Further, when the operator presses "Delete" of "Action", the currently selected row of the left-hand table is put in the unset state. Further, when the operator presses "Default" of "Action", the currently selected row of the left-hand table is put in the default state. The default state is a state stored in advance in the vision mixer controller 115, and is, for example, a state in which the same number of the output signal of the internal circuit is set to all the output port numbers.

FIG. 15 shows another example of the editing screen of the output assign table. In this example, options of "Aux1" to "Aux15" are displayed as "Internal Signal Selection". "Aux1", "Aux2", . . . are logical names and functions of output lines which make it possible to determine which one is output through the cross-point button sequence in operation as an external output. As an example of applications, these are used for video signals to be displayed on a monitor in a studio.

Next, a display configuration of the display 128 by the multi viewer processor 112 will be described.

Figure 16:
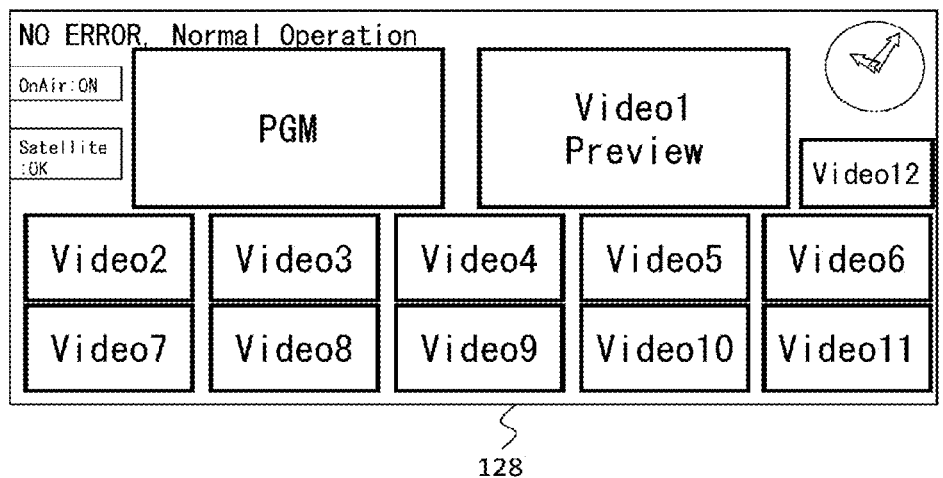
FIG. 16 A diagram showing an example of a display configuration of a display by a multi viewer processor.

FIG. 16 shows an example of a display configuration (display configuration on first mode) of the display 128 by the multi viewer processor 112. The rectangular region of "PGM" is a display region of an image based on video signals of a program (PGM) output from the vision mixer main frame 113. Rectangular regions of "Video1" to "Video11" are respectively display regions of images based on video signals of "Video1" to "Video11". For example, the video signals of "Video1" to "Video11" are transmitted from the vision mixer main frame 113 to the multi viewer processor 112 through an optical transmission path. The rectangular region of "Video1 Preview" is a display region of a preview (image based on video signals of preview output). The video signals of the preview output are video signals scheduled to become next program outputs.

A display configuration of the display 128 based on this multi viewer processor 112 is determined in a manner that depends on an operation on the control panel 116, and stored by the vision mixer controller 115. Then, designation information of a display region of the image based on the respective video signals is transmitted from the vision mixer main frame 113 to the multi viewer processor 112 while being inserted in an optical multiplex signal including of "Video1" to "Video11" described above, for example. This designation information of the display region also includes designation of the arrangement and the size in the screen of "PGM".

Note that it is also conceivable that this designation information of the display region is directly transmitted from the vision mixer main frame 113 to the multi viewer processor 112 through a control system line. Further, in the display screen of the display 128, clock, character strings and symbols indicating the operation states, and other information (OnAir: ON, Satellite: OK, etc.) are, as shown in the figure, arranged besides the images based on the video signals. Further, the designation information is stored in the multi viewer processor 112. Thus, even if it is powered off, the designation information is restored by starting it.

Figure 17:
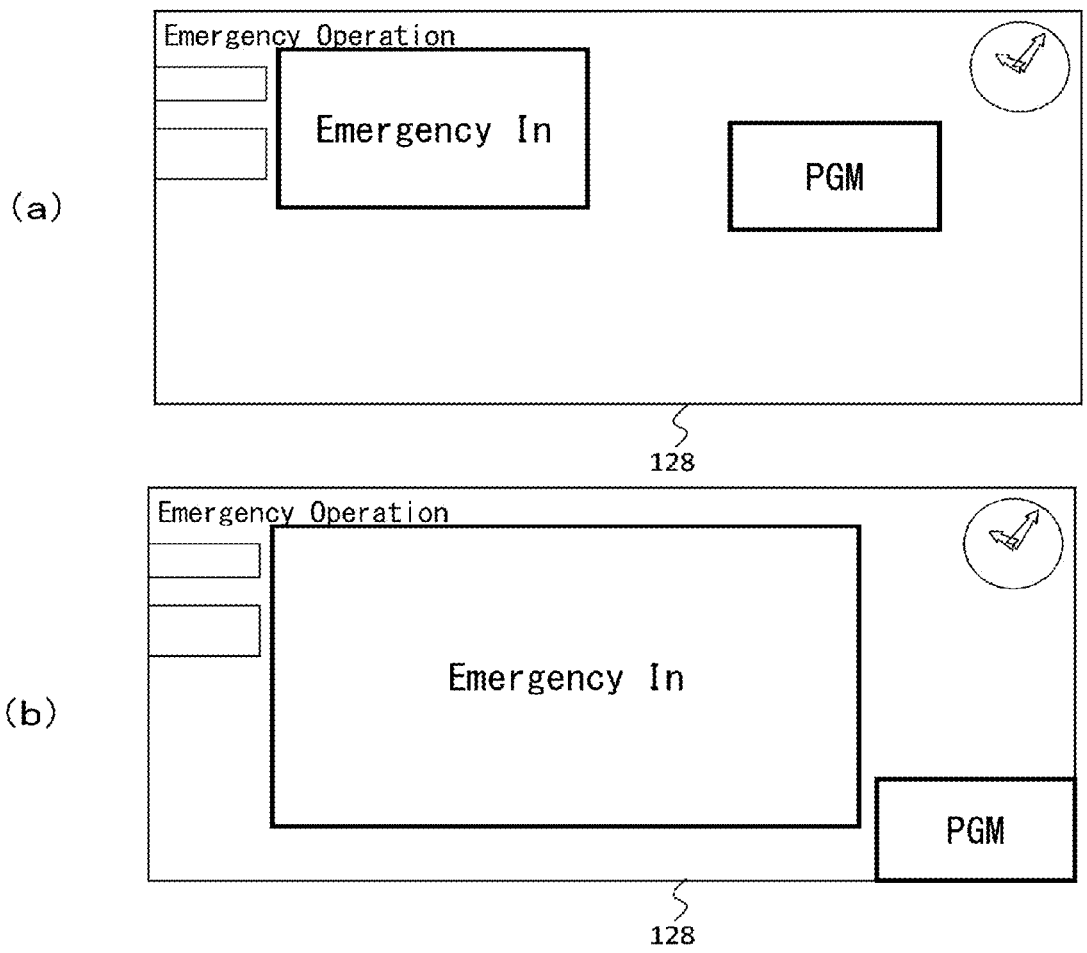
FIG. 17 A diagram showing an example of a display configuration of the display in an emergency operation.

(A) of FIG. 17 shows an example of a display configuration (display configuration on second mode) of the display 128 in an emergency operation. When receiving, at the control terminal 112a (see FIGS. 2 and 3), an instruction (switching instruction) to switch to the emergency operation from the control panel 116 or the like, the multi viewer processor 112 switches to such a display configuration. The rectangular region of "Emergency In" is a display region for the image based on the video signals from the emergency switch 111. The rectangular region of "PGM" is a display region for the image based on the video signals of the program (PGM) output from the vision mixer main frame 113. In a case where the video signals of this program (PGM) output are absent, a black screen is displayed there.

(B) of FIG. 17 shows another example of the display configuration of the display 128 in the emergency operation. This example is obtained by making the rectangular region of "Emergency In" larger than that of the display configuration shown in (a) of FIG. 17. Although the multi viewer processor 112 is normally controlled by the vision mixer controller 115, the multi viewer processor 112 can also receive an instruction (emergency-switching instruction) to switch to the emergency operation, and switching to the normal operation, directly from the control panel 116 or the like.

Figure 18:
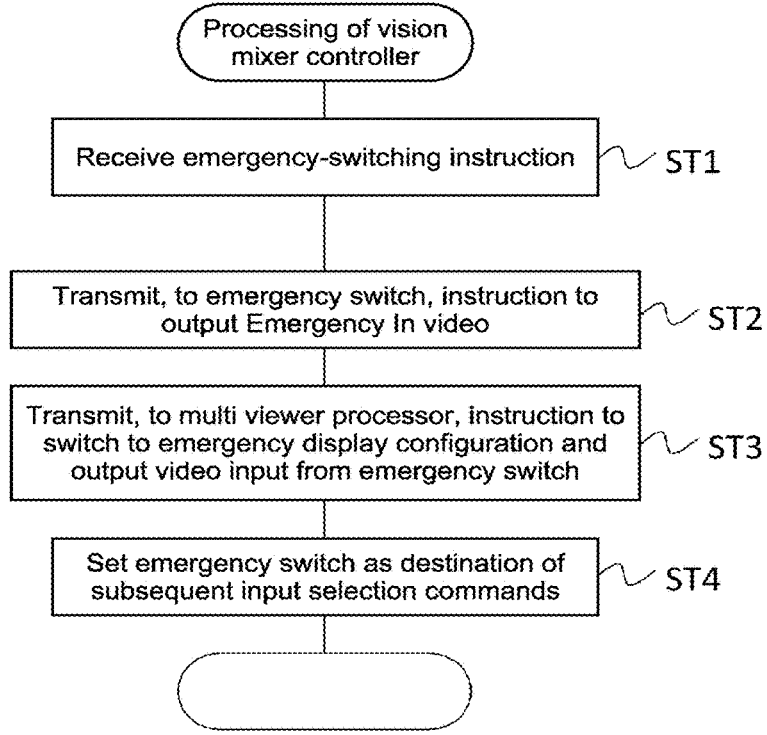
FIG. 18 A flowchart showing an example of a processing procedure in a case of switching to the emergency operation in a vision mixer controller.

The flowchart of FIG. 18 shows an example of a processing procedure in a case of switching to the emergency operation in the vision mixer controller 115. In Step ST1, the vision mixer controller 115 receives an emergency-switching instruction from the control panel 116 or the like.

Next, in Step ST2, the vision mixer controller 115 transmits, to the emergency switch 111, an instruction to output video signals input as "Emergency In".

Next, in Step ST3, the vision mixer controller 115 transmits, to the multi viewer processor 112, an instruction to switch a normal display configuration (display configuration on first mode) (see FIG. 16) to an emergency display configuration (display configuration on second mode) (see (a) and (b) of FIG. 17) and output a video input from the emergency switch 111.

Next, in Step ST4, the vision mixer controller 115 sets the emergency switch 111 as a destination of subsequent input selection commands.

Figure 19:
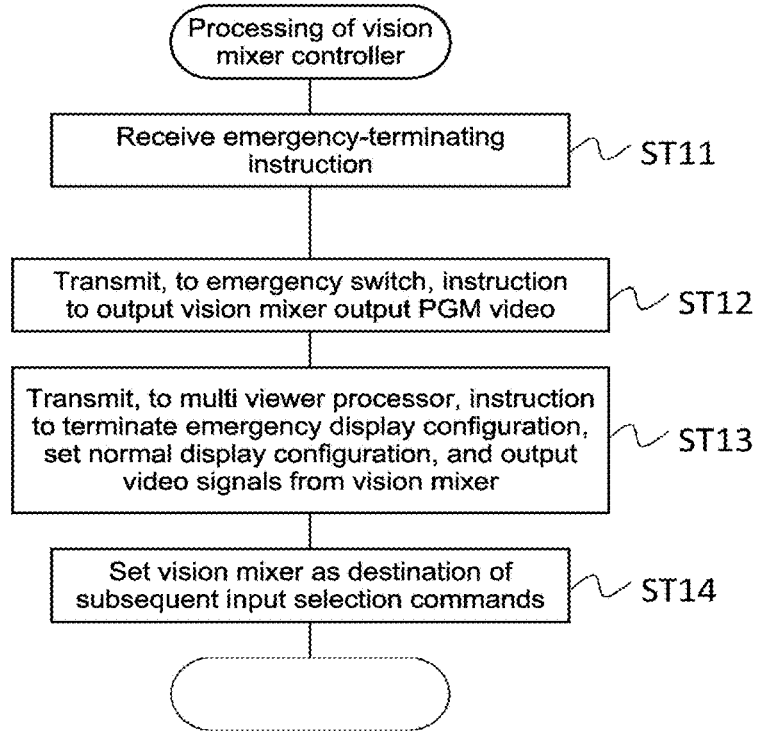
FIG. 19 A flowchart showing an example of a processing procedure in a case of switching from the emergency operation to a normal operation in the vision mixer controller.

The flowchart of FIG. 19 shows an example of a processing procedure in a case of switching from the emergency operation to the normal operation in the vision mixer controller 115. In Step ST11, the vision mixer controller 115 receives, from the control panel 116 or the like, an instruction to terminate the emergency operation.

Next, in Step ST12, the vision mixer controller 115 transmits, to the emergency switch 111, an instruction to output video signals of a program output (PGM) of the vision mixer main frame 113.

Next, in Step ST13, the vision mixer controller 115 transmits, to the multi viewer processor 112, an instruction to terminate the emergency display configuration, switch to the normal display configuration, and output the video signals from the vision mixer main frame 113.

Next, in Step ST14, the vision mixer controller 115 sets the vision mixer main frame 113 as a destination of subsequent input selection commands.

Next, a screen (GUI screen) that can be displayed and operated on the control panel 116 or the GUI panel 117 will be described.

(C) of FIG. 20 shows an example of a select dialog box (third user interface screen) for selecting a storage location of the video clip to be operated. "Local" indicates the clip storage board 151 of the vision mixer main frame 113. "Net1" is a network name and "server1", "poserver1", and "server3" at a lower level thereof are names of servers.

"Select" is a button for selecting a directory and returning to a screen of this directory. "Open" is a button for displaying the contents of the directory as a tree view without returning to the screen of the directory.

(A) of FIG. 20 shows an example of a directory screen (first user interface screen) in a case where, in the select dialog box of (c) of FIG. 20, the directory of "local" is selected and the button of "select" is operated.

"Select" is a button for opening the above-mentioned select dialog box. "CS Disk Free" indicates a free space capacity of the storage (A) 151a of the clip storage board 151. In the example shown in the figure, it is shown that the free space capacity is 12.5 GB. "CS FM Free" indicates a free space capacity of the video frame memory 151b of the clip storage board 151. In the example shown in the figure, it is shown that the free space capacity is 7.2 GB. "Disk Free" indicates a free space capacity of the storage of the directory currently displayed on the screen, and takes, in the example shown in the figure, the same value as "CS Disk Free". "/local" indicates a position of the current directory.

A group of icons at the center displays lower-level directories (folders) and clips (still images and moving images). The clip shown by the broken-line frame indicates a currently selected clip. The clips shown by the thick-solid line frames indicate that these are retained in the video frame memory 151b, i.e., that these have been loaded. Note that, although the loaded clips are shown by the thick-solid line frames in this description, these may be displayed on another display mode, for example, with predetermined color frames or the like. Further, the clips with the triangle marks mean moving-image clips and the clips without them mean still-image clips.

"Play" is a button for instruction to output the selected clip as video signals. Names such as "FMO1" to "FMO8" are given to output channels, and one of the output channels is selected on another screen (not shown). When the operator (user) selects any video clip (file) and presses the button of "Play", the control panel 116 transmits, to the clip storage board 151, a control command to perform video output of this video file (clip).

"Load" is a button for instruction to load the selected clip into the video frame memory 151b (load instruction). When the operator (user) selects any video clip (file) and presses the button of "load", the control panel 116 transmits, to the clip storage board 151, a load command to load this video file from the storage 151a into the video frame memory 151b.

"Unload" is a button for instruction to delete the selected clip from the video frame memory 151b when the selected clip has been loaded. Immediately after the "Play" button receives an operation (click), video signal output of the loaded clip is started. If the selected clip has not been loaded, it is necessary to load it for output, and it takes time therefor, and the output is started after that.

Figure 21:
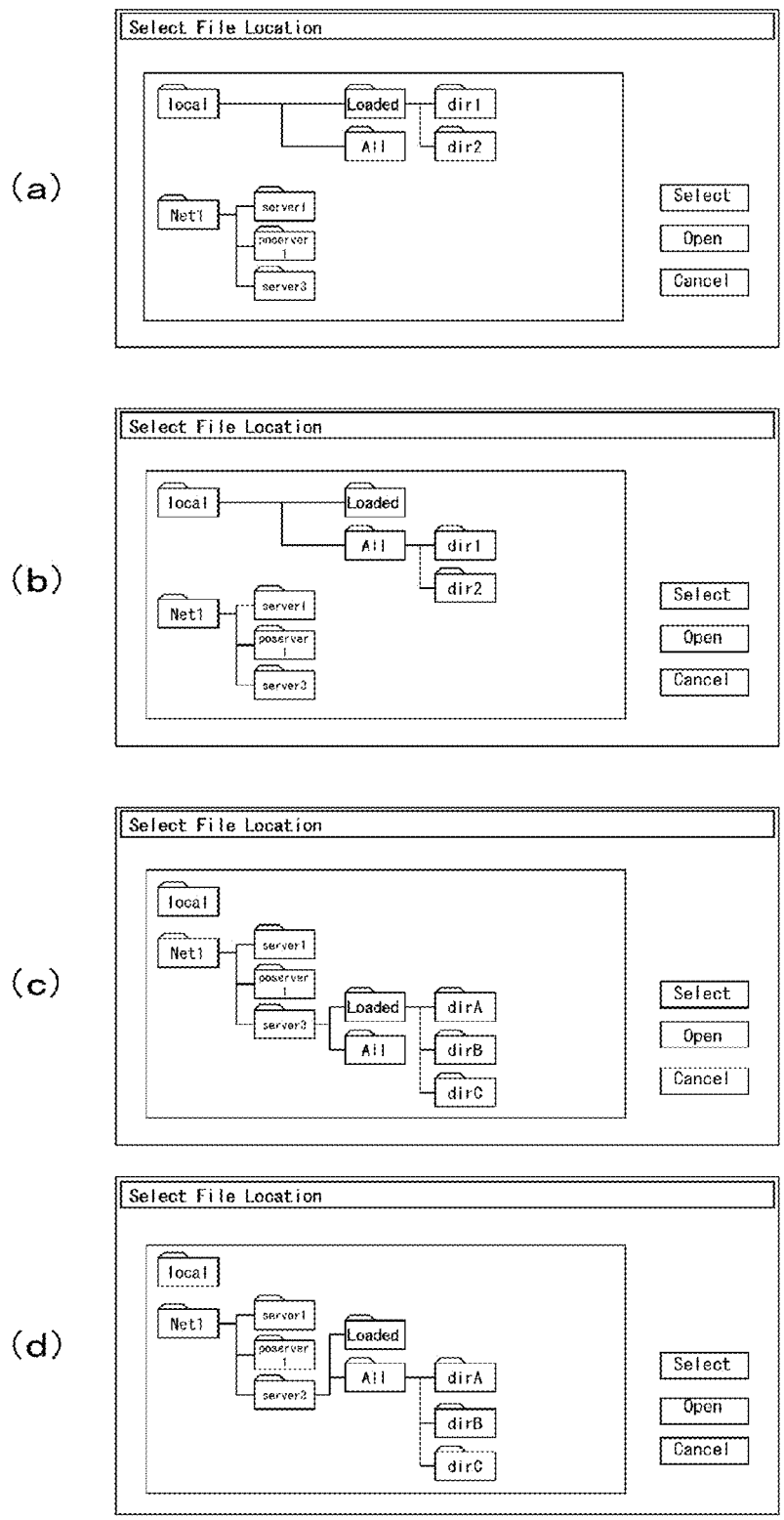
FIG. 21 A diagram showing an example of a select dialog box.

(B) of FIG. 20 shows an example of a directory screen (second user interface screen) in a case where, in the select dialog box of (d) of FIG. 21, the directory "dirA" in the directory of "Sever3" that is the external server is selected and the button of "select" is operated. "Disk Free" indicates a free space capacity of the storage of that directory. In the example shown in the figure, it is shown that the free space capacity is 755 GB. "//server3/dirA" indicates a position of the current directory.

A group of icons at the center displays a lower-level directory (folder) of the directory "dirA" and clips (still images and moving images). The clip shown by the broken-line frame indicates a currently selected clip. The clips shown by the thick-solid line frames indicate that these are retained in the video frame memory 151b, i.e., that these have been loaded. Note that, although the loaded clips are shown by the thick-solid line frames in this description, these may be displayed on another display mode, for example, by predetermined color frames or the like. Further, the clips with the triangle marks mean moving-image clips and the clips without them mean still-image clips.

"Play" is a button for instruction to output the selected clip from the clip storage board 151 as video signals. In this case, this video file is transferred from the video server 108 to the clip storage board 151, and output as the video signals.

"ServerPlay" is a button for instruction to output the selected clip from the server as video signals. The clips shown by the thick-solid line frames are loaded into the server, and a time from press (click) of the button of "ServerPlay" to output of the video signals is short. When the operator (user) selects any video clip (file) and presses the button of "Play", the control panel 116 transmits, to the video server 108, a control command to perform video output of this video file (clip).

"Load" is a button for instruction to perform loading in the server (play preparation). When the operator (user) selects any video clip (file) and presses the button of "load", the control panel 116 transmits, to the video server 108, a load command to load this video file from the storage 108a into the video circuit 108b. "Unload" is a button for instruction to cancel loading.

"Import" is a button for issuing an instruction for causing the clip storage board 151 to transfer the clip via the network. A transfer destination is the video frame memory 151b of the clip storage board 151. However, with another setting, the storage (A) 151a of the clip storage board 151 may be the transfer destination. When the operator (user) selects any video clip (file) and presses the button of "Import", the control panel 116 transmits, to the video server 108, a transfer command to transfer this video file.

Note that, for the button of "ServerPlay", control of the cross points of the internal buses set in advance can be set as an operation target linked to play start on another screen. At this time, an input signal line in which the video signal output of the corresponding server is input is also set. For example, in a case where the internal bus that is "Aux1" output is set, when a video signal is output from the server due to the button of "ServerPlay" and enters the vision mixer main frame 113, then, control is performed such that the corresponding input signal line is selected at the cross point of "Aux1". The same applies to a case where the internal bus or the like of the M/E is set, and more complicated M/E operation can also be linked favorably.

Next, as another GUI example, an example in which separate logical directories are used in a case of setting only a loaded clip and in a case of setting all clips will be described.

(A) of FIG. 21 shows a state in which the directory of "local" is opened and the directory of "loaded" is also opened. (B) of FIG. 21 shows a state in which the directory of "local" is opened and the directory of "all" is also opened. (C) of FIG. 21 shows a state in which the directory of "server3" is opened and the directory of "loaded" is also opened. (D) of FIG. 21 shows a state in which the directory of "server3" is opened and the directory of "all" is also opened. Here, "loaded" is a logical directory for displaying only the loaded clip, and "All" is a logical directory for displaying all the clips. It is expressed as the logical directory in each storage location.

Figure 22:
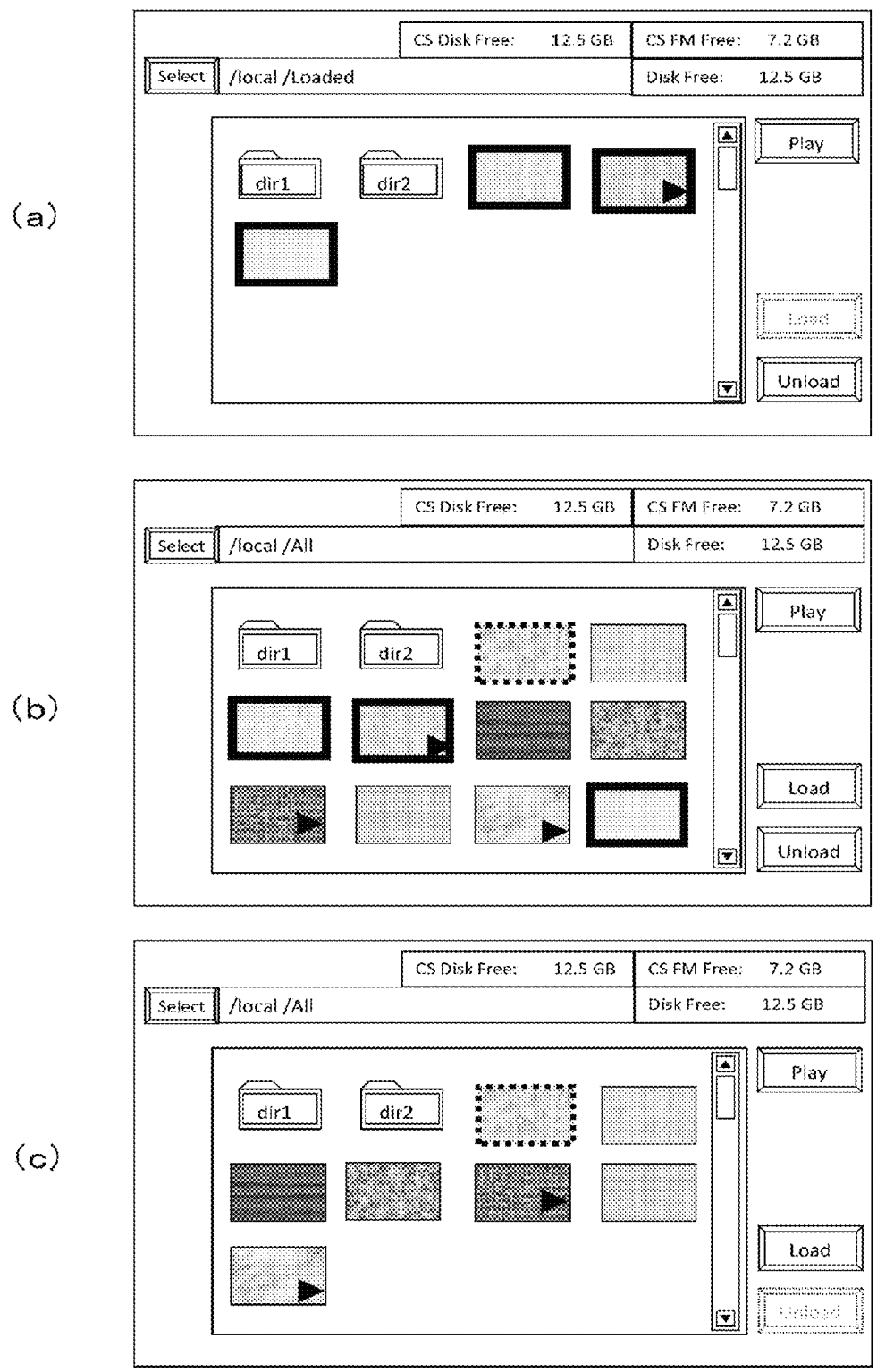
FIG. 22 A diagram showing an example of a state in which a directory is opened.

Although the detailed description will be omitted, (a) of FIG. 22 shows an example of a directory screen in a case where, for example, in the select dialog box of (a) of FIG. 21 or (b) of FIG. 21, the directory of "loaded" in the directory of "local" is selected and the button of "select" is operated. (B) of FIG. 22 shows an example of a directory screen in a case where, in the select dialog box of (a) of FIG. 21 or (b) of FIG. 21, the directory of "all" in the directory of "local" is selected and the button of "select" is operated.

(C) of FIG. 22 shows an example of a directory screen in a case where, as another example, in the select dialog box of (a) of FIG. 21 or (b) of FIG. 21, the directory of "all" in the directory of "local" is selected and the button of "select" is operated. In this example, the loaded clip is not displayed and the "Unload" button is accordingly invalidated.

Figure 23:
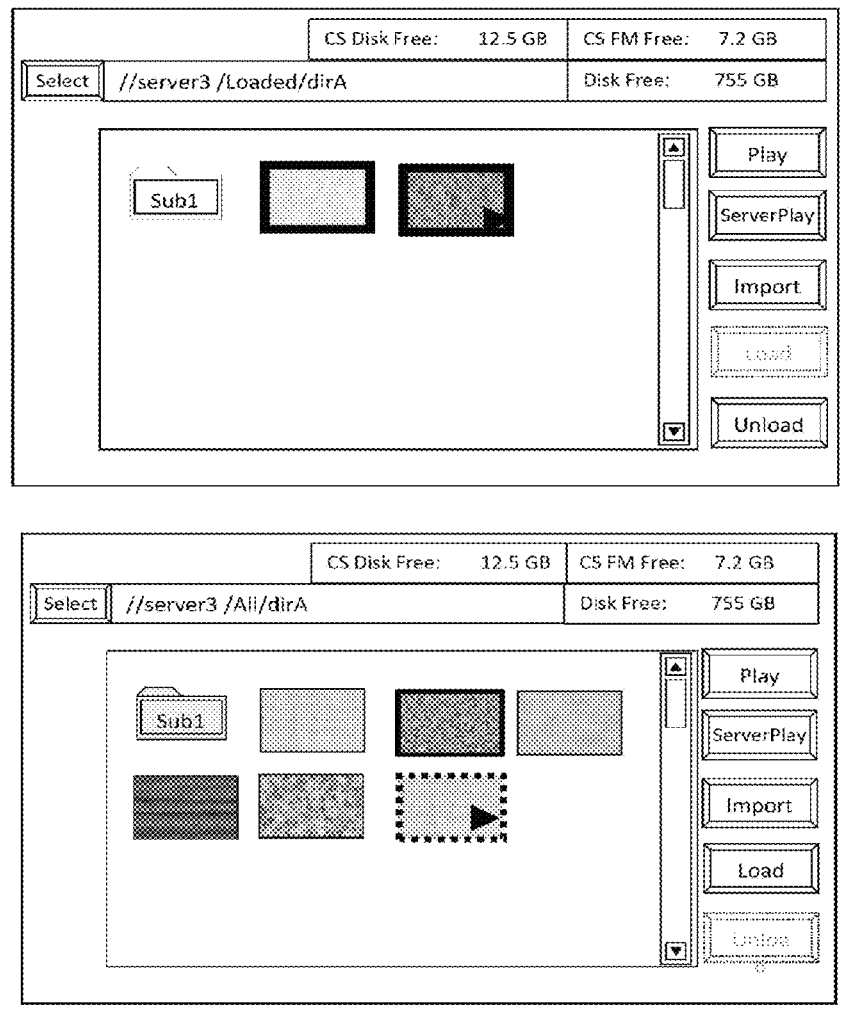
FIG. 23 A diagram showing an example of a state in which a directory is opened.

(A) of FIG. 23 shows an example of a directory screen in a case where, in the select dialog box of (c) of FIG. 21, the directory of "dirA" included in the directory of "loaded" in the directory of "Sever3" that is the external server is selected and the button of "select" is operated. (B) of FIG. 23 shows an example of a directory screen in a case where, in the select dialog box of (d) of FIG. 21, the directory of "dirA" included in the directory of "all" in the directory of "Sever3" that is the external server is selected and the button of "select" is operated.

Figure 24:
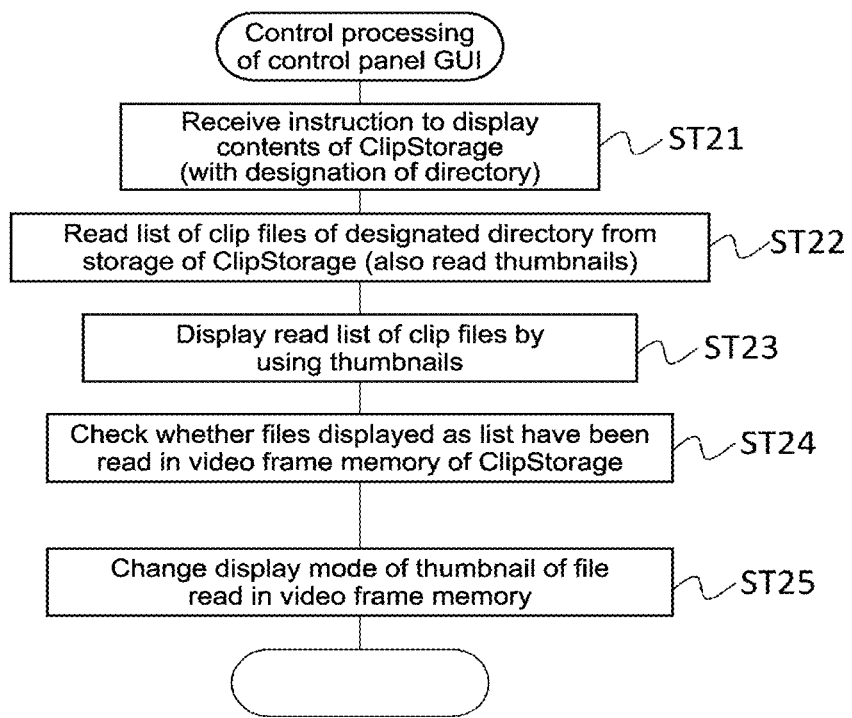
FIG. 24 A flowchart showing an example of an operation procedure of displaying the contents of storage of the clip storage board in the control panel.

The flowchart of FIG. 24 shows an example of an operation procedure of display of the contents of storage (A) 155a of the clip storage board 151 in the control panel 116. In Step ST21, the control panel 116 receives an instruction to display the contents of the storage (A) 155*a* of the clip storage board 151 in accordance with an operator's operation. This instruction also includes designation of the directory.

Next, in Step ST22, the control panel 116 reads a list of clip files of the designated directory from the storage (A) 155*a* of the clip storage board 151. At this time, the control panel 116 also reads thumbnails. Next, in Step ST23, the control panel 116 displays the read list of clip files by using the thumbnails.

Next, in Step ST24, the control panel 116 checks whether the clip files displayed as the list have been read in the video frame memory 151*b* of the clip storage board 151, that is, whether these have been loaded.

Next, in Step ST25, the control panel 116 changes the display mode of the thumbnail of the clip file read in the video frame memory 151*b*.

Next, a resource share function in the vision mixer main frame 113 will be described. This resource share function is a function of assigning each of the functional blocks of the vision mixer main frame 113 to any of a plurality of units of operation (which are separately operated for different purposes, for example, for production of different broadcasting channels), subdividing the single vision mixer main frame 113, classifying them into groups, and realizing a plurality of types of operation.

Figure 25:
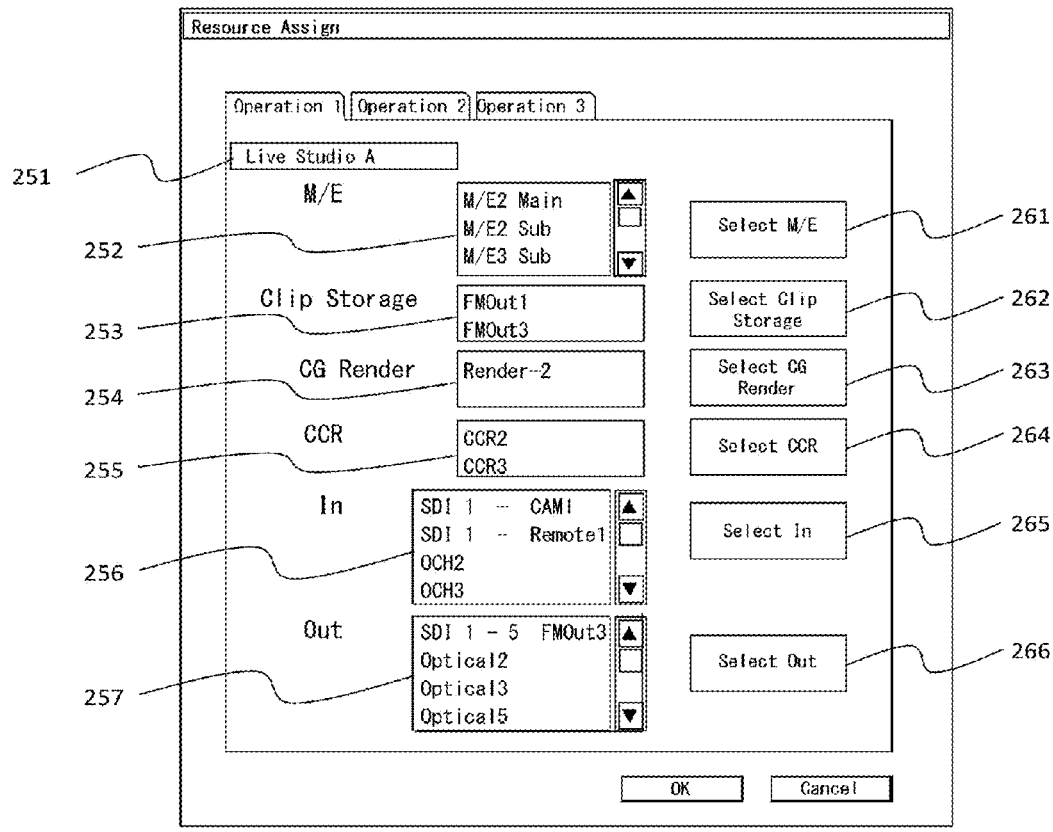
FIG. 25 A diagram showing an example of a GUI screen for performing output assign for each group during resource share in the control panel.

FIG. 25 shows an example of a GUI screen for assigning the functional blocks during resource share in the control panel 116. The tab of the GUI corresponds to one of groupings. The reference sign 251 refers to a text box in which a name of the grouping can be input. In the example shown in the figure, a state in which the tab of "Operation 1" is selected is shown. In the text box, "Live Studio A" is input.

The reference sign 252 refers to a list box for dividing "M/E" into main and sub and displaying those made to belong to the group of this tab. The reference sign 253 refers to a list box for displaying those made to belong to the group of this tab with respect to a plurality of output lines of "ClipStorage". Further, the reference sign 254 refers to a list box for displaying those made to belong to the group of this tab with respect to a plurality of output lines of "CG Render". Further, the reference sign 255 refers to a list box for displaying those made to belong to the group of this tab with respect to a plurality of output lines of "CCR".

Further, the reference sign 256 refers to a list box for displaying those made to belong to the group of this tab with respect to a plurality of input lines (In). Further, the reference sign 257 refers to a list box for displaying those made to belong to the group of this tab with respect to a plurality of output lines (Out). Regarding the input lines (In) and the output lines (Out), these are in units of groups. Otherwise, group names and signal channel/line names therein can also be both displayed and these can also be made to belong to the group for each channel/line.

Figure 26:
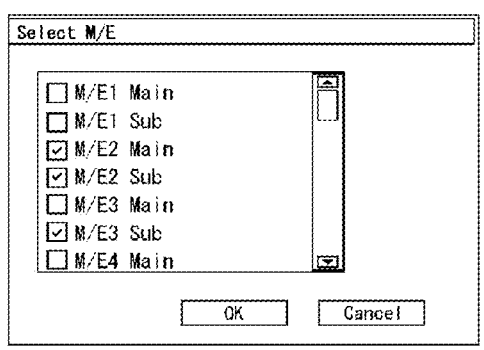
FIG. 26 A diagram showing an example of a GUI screen in a case where the button of "Select M/E" is pressed.

Buttons of 261 "Select M/E", 262 "Select Clip Storage", 263 "Select CG Render", 264 "Select CCR", 265 "Select In", 266 "Select Out", and the like are for opening a screen for selecting an element to be made to belong to the group. For example, FIG. 26 is a GUI screen in a case where the button of "Select M/E" is pressed. The operator can select the M/E to be made to belong to it by performing a check operation on this GUI screen.

Figure 27:
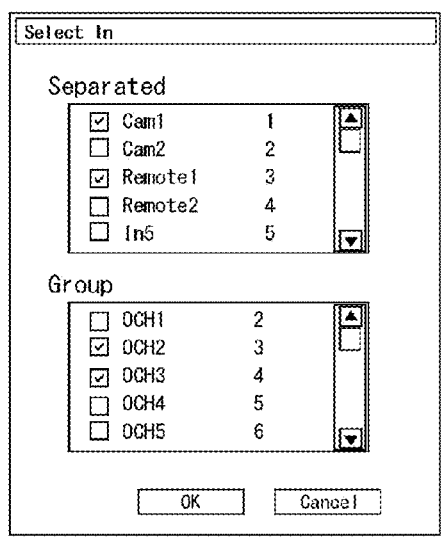
FIG. 27 A diagram showing an example of a GUI screen in a case where the button of "Select In" is pressed.

Further, for example, FIG. 27 is a GUI screen in a case where the button of "Select In" is pressed. The operator can select an input line to be made to belong to it by checking, "Separated", i.e., for each channel/line or "Group", i.e., for each group those made to belong to this group on this GUI screen. Although the detailed description will be omitted, a similar GUI screen for selection is displayed and operator's selection is enabled to be performed also when another button is pressed.

Each of the three control panels 116 in the sector of FIG. 1 is capable of assigning each of the functional blocks to any of the units of operation (Operation 1, Operation 2, and Operation 3). The control panel 116 includes GUIs in which the units of operation are enumerated and displayed and one of them is selected. When a selection operation is performed, only the functional block of the vision mixer main frame (effect switcher) 113, which is assigned to this unit of operation, can be operated through the control panel 116. With this, the functional blocks assigned to other operation purposes are prevented from being erroneously operated.

As described above, in the broadcasting system 10 shown in FIG. 1, the vision mixer main frame 113 in the sector 101 includes the output terminal (optical connector) that outputs a plurality of video signals to be transmitted to the multi viewer processor 112 as an optical multiplex signal. Therefore, the multi viewer processor 112 can be efficiently supplied with the plurality of video signals.

Further, in the broadcasting system 10 shown in FIG. 1, the vision mixer main frame 113 in the sector 101 includes the terminal (SDI connector) that outputs video signals (single video signals) of the program output (PGM) to be transmitted to the multi viewer processor 112. Information for designating the display region for the image based on the video signals of the program output (PGM) is inserted into the optical multiplex signal of the plurality of video signals to be transmitted to the multi viewer processor 112. Therefore, the display region for the image based on the video signals of the program output (PGM) on one screen on which images based on the plurality of video signals are displayed can be easily and simply designated to the multi-view processor 112.

Further, in the broadcasting system 10 shown in FIG. 1, the operator (user) is enabled to edit the input assign table in the M/E block of the vision mixer main frame 113 in the sector 101 on a basis of the GUI screen through the control panel 116. Therefore, the operator can efficiently edit this input assign table.

Further, in the broadcasting system 10 shown in FIG. 1, the control panel 116 in the sector 101 is connected to the video server via the network. Therefore, the control panel 116 is enabled to handle not only the video files in the storage 151*a* of the clip storage board 151, but also the video files in the storage 108*a* of the video server 108 connected via the network.

Further, in the broadcasting system 10 shown in FIG. 1, the first user interface screen showing the video files in the storage 151*a* of the clip storage board 151 or the second user interface screen showing the video files in the video server 108 are selectively displayed at the control panel 116 in the sector 101. Therefore, the user (operator) is enabled to correctly recognize the video files in the storage 151*a* of the clip storage board 151 and the video files in the video server 108 and to perform a control operation.

Further, in the broadcasting system 10 shown in FIG. 1, the third user interface screen for selecting the display of the video files in the storage 151*a* of the clip storage board 151 or the display of the video files in the video server 108 is displayed at the control panel 116 in the sector 101. Therefore, the user (operator) is enabled to easily select displaying the first user interface screen or displaying the second user interface screen, on the third user interface screen.

2. Modified Example

Note that, in the above-mentioned embodiment, the example to which the present technology is applied to the broadcasting system 10 has been shown. However, the present technology can also be applied to other technical fields as a matter of course.

The present technology may be modified as follows.

The function of setting the operation target linked to the play start in the button of "ServerPlay" has been described above. Further, the capability of assigning the video signals (FMOut1, etc. of FIG. 11) from ClipStorage as options at the cross point (button sequence) has been described above. However, in addition, those which are automatically selected from the video signals from ClipStorage and the video signals from the video server 108 may be the options at the cross point button. For example, for FMOut1, an additional GUI may be enabled to designate and set a target to be automatically selected (certain output channel of certain video server 108, Server V In of FIG. 4). When a Play operation is performed on FMOut1, cross-point control may be performed to select the video signal of FMOut1 in a bus in which the cross point button is selected. When a Play operation is performed in a designated output channel of a designated video server, cross-point control may be performed to select the video signal (Server V In of FIG. 4) in the bus in which the cross point button is selected.

In the clip storage board 151, the video signal generation circuit may be configured such that the loaded video clip is output as a video signal within one frame after the clip storage board 151 receives an instruction, for example.

Regarding the video server, the example in which the "play" button and the "ServerPlay" button are arranged on an identical screen and the example in which the "Load" button and the "Import" button are arranged have been described above. A further function may be added to it, and a button for automatically selecting whether to transfer a file set as an operation target (selected through GUI) to the clip storage board 151 for playing it or to play it by the video server may be displayed on the screen. In this case, when the "Load" button is pressed, whether to transfer the file to the clip storage board 151 for loading it or to load it into the video server (preparation for continuously outputting video) is automatically selected. Further, when the "play" button is pressed, whether the video signal is output from the clip storage board 151 or from the video server is automatically selected. The result indicating which one has been selected may be displayed by using the display mode of the file or the like in the GUI.

Determination as to which one is selected may be based on any one of the following references, for example, if the file size is smaller than a set value if that video file is used in a processing state or during execution of a processing sequence of the switcher to be saved if an estimation value of a required time for transferring the file in the network is small.

Then, the file may be transferred to the clip storage board 151 for loading it.

As another modification, when the video file in the video server is played (video signal output), the file may be simultaneously transferred to the clip storage board 151.

As a modification of the operation of the switcher of the present invention, video files in the clip storage board 151 may be all loaded at the start of the switcher. Alternatively, priorities may be set to the video files, and the video files may be loaded in the order of descending priorities as long as the memory can store them.

Which input line (FIG. 6) the video server (and output channel thereof) corresponds to may be set through an additional GUI. Regarding the files in the video server, only files whose paths (channels) for supplying video signals to the switcher are thus set may be displayed as targets to be operated in a GUI.

Further, the present technology may be modified as follows.

Regarding the editing screen as shown in FIG. 10, an attribute of the group may be displayed in addition to the group name. For example, if a certain group is an input from the optical communication path, a character string, "optical input", may be displayed. Further, the name of each video signal from the signals input from the optical connector may be extracted and used for display. Further, information regarding the group may be extracted from them and displayed as the attribute of the group. Further, regarding each input video signal (channel), a circuit that determines whether a valid video signal has been input at that time may be provided, and the determination result of the validity/invalidity may be displayed for each input video signal. Invalid input video signals may be limited such that these are prevented from being set as selection targets.

A technique in which the buttons of the cross-point button sequence are provided with lighting functions to achieve various lighting modes is well-known as a technique of the operator console of the control panel 116. The lighting modes include, for example, light colors and blinking. Regarding each input video signal (channel), a circuit that determines whether a valid video signal has been input at that time may be provided, and the determination result of the validity/invalidity may be reflected on the lighting modes of the corresponding button. For example, the light of the button corresponding to the invalid input video signal may be extinguished and the button corresponding to the valid input video signal may be lightened up.

Regarding grouping of input video signals coming from the network in the form of packets, these may be grouped on a basis of network address information of transmission sources, for example, such that those having the same high-order digit of the address belong to the same group.

In a case where the input source employs optical multiplex transmission, each optical transmission signal is a signal including a plurality of video signals whose packets are multiplexed, and a configuration in which it is received as an input may be employed. In this case, a configuration in which these are divided into individual video signals by a optical multiplex reception circuit and an associated circuit is employed.

In the editing screen as shown in FIG. 14, an attribute of the group may be displayed in addition to the group name. For example, if a certain group is an output to the optical communication path, a character string, "optical output", may be displayed.

Another configuration example in which the editing screen as shown in FIG. 14 is applied may include:

a plurality of video stream output circuits that output video signals in a predetermined format;

an output assign correspondence table that stores correspondence between each of the video stream output circuits and any of output signals of an internal circuit block;

an output assign circuit;

an output assign control apparatus that refers to the output assign correspondence table, and controls the output assign circuit such that the output signal of the internal circuit block is connected to the video stream output circuit; and a control apparatus, a display apparatus, and an input apparatus that realize a GUI for editing the output assign correspondence table, the GUI displaying the video stream output circuits in groups in an enumerated manner or as a list or table, receiving an operation for making each of the video stream output circuits to correspond to the output signal of the internal circuit block, and updating the output assign correspondence table.

Internal signal numbers of a plurality of video signals to be output to the multi viewer processor 112 via an optical output terminal may be displayed in a GUI for setting a screen configuration of the multi viewer processor 112. In addition, a group number may also be displayed.

In the editing screen as shown in FIG. 14, a means for receiving a group selection operation may be further provided. A function of receiving an operation of setting, in a batch, buses logically called Aux to a plurality of outputs of one group selected by it may be provided. Here, the buses logically called Aux are output buses capable of selecting both of an externally input video signal and a video signal processed by the internal circuit in accordance with an operation.

In the operator console, in a case of configuration in which setting (delegation setting) is made possible such that any of a plurality of Aux buses and the like can be operated through a certain cross-point button sequence, a group number and a group name of the set Aux bus may be displayed on a character display unit like a liquid-crystal display that displays the setting thereof.

As a usage/application example of the effect server 107, a plurality of programs (script/macro/sequence) to be loaded into the microcomputer in the vision mixer main frame 113 or the computer in the vision mixer controller 115 may be retained in the effect server 107. Here, the plurality of programs (script/macro/sequence) are programs for controlling the vision mixer main frame 113 and the like in a time series to perform time-series video combining processing.

Programs generated by the microcomputer in the vision mixer main frame 113 or the computer in the vision mixer controller 115 may be transmitted to the effect server 107 and retained in accordance with an operation received by a GUI of the control panel.

The programs retained by the effect server 107 may be transmitted to the microcomputer in the vision mixer main frame 113 or the computer in the vision mixer controller 115 in accordance with an operation received by the GUI such that the programs can be executed.

Further, the effect server 107 may have a function of receiving upload of the programs from a PC, to which it is connected via the network, and retaining the received programs.

Further, the effect server 107, the microcomputer in the vision mixer main frame 113, or the computer in the vision mixer controller 115 may have a function of determining whether a program retained by the effect server 107 can be executed by a device (hardware and software) of a certain vision mixer main frame and displaying the determination result. In addition, an operation change regarding whether to transmit and receive the program, whether to receive an execution operation, and the like may be made in a manner that depends on the determination result.

The program may be simply executed as it is. Additionally, the program may be changed in accordance with an operation regarding some functions, for example, selection of a video signal source or adjustment of parameters, and executed.

The IP-Sync input unit 133 may operate while switching for each input video signal between a first mode: a mode on which external video signals based on a packet sequence are internally supplied while synchronizing/locking them to the synchronization signal inside the vision mixer main frame 113 with a delay time shorter than the time corresponding to one frame (by buffering for time shorter than time corresponding to one frame, only for lock), and a second mode: a mode on which external video signals based on a packet sequence are internally supplied while synchronizing/locking them to the synchronization signal inside the vision mixer main frame 113 with a delay time equal to or longer than the time corresponding to one frame (by buffering that can overcome delay due to codec processing and variations in transmission delay).

A GUI may be enabled to set which mode is used for each input. In this case, it may be possible to set which mode is used for each group of inputs. In addition, which mode is used may be automatically determined. For example, apparatuses in the same sector, for example, in the same studio, may be set to be on the first mode and other apparatuses may be set to be on the second mode. Alternatively, a distance and a delay may be estimated on a basis of routing control, and the second mode may be used if these are larger than predetermined values.

Whether each input can be set on the first mode may be shown by changing the display mode for each input in each display of a GUI. Alternatively, it may be shown by changing the lighting mode of the button for the corresponding input video signal in the cross-point button sequence.

After each input is set on the first mode or the second mode manually or automatically, the mode on which the corresponding input video signal is set may be shown by changing the lighting mode of the button in the cross-point button sequence.

The lighting mode of each button of the cross-point button sequence may be changed in a manner that depends on a transmission situation of the corresponding input video signal. The transmission situation may include a reception state, a delay time, frequency of losses of frames/fields due to some communication situations, compression/uncompression, a compression rate, whether or not synchronous connection is performed, and the like.

Hereinabove, the case where each physical terminal is provided with the input and the output of the video signal have been shown.

Alternatively, a plurality of connectors, an input/output classification correspondence table, an input/output-switching circuit, and a GUI may be provided.

The plurality of connectors may be physically connected to a transmission path of optical multiplex transmission or multi-link optical transmission (multi-conductor).

The input/output classification correspondence table may store an input or output for each of the connectors.

The input/output-switching circuit may switch, in accordance with the input/output classification correspondence table, a built-in transmission path (video path) of each connector between one for input (reception) and one for output (transmission) for each connector.

If switching a certain connector to the one for input, the input/output-switching circuit may switch all the transmission paths (channels) included in the connector to the one for video input. If switching a certain connector to the one for output, the input/output-switching circuit may switch all the transmission paths included in the connector to the one for video output.

The GUI is a GUI for editing the input/output classification correspondence table. The GUI is a GUI for enumerating and displaying the connectors and receiving a selection operation of switching each connector to the one for input or the one for output.

In addition, in the GUI for editing the input assign table, the input/output classification correspondence table may be referred to, and an input corresponding to the connector switched to the one for output may be displayed as an unset state and an operation to assign it may be prevented from being received.

In addition, in the GUI for editing the output assign table, the input/output classification correspondence table may be referred to, an output corresponding to the connector switched to the one for the input may be displayed as an unset state and an operation to assign it may be prevented from being received.

In addition, the input/output classification correspondence table may store whether each of the transmission paths (channels) included in each connector is for input or for output, and the GUI and the like may be controlled in a manner that depends on it.

Each optical connector may be for a bi-directional optical transmission path (may include a light-receiving portion and a light-emitting portion). Further, a light reception-determining circuit that detects reception of a valid optical transmission signal with respect to the included transmission path (channel) may be provided. Then, if the detection result does not correspond to the contents of the input/output classification correspondence table, it may be displayed as information. Alternatively, the contents of the input/output classification correspondence table may be determined (written) in a manner that depends on the detection result. Further, only if (result of discordance) the detection result does not correspond to the contents of the input assign table or the output assign table, it may be displayed as information.

In a manner that depends on the detection result of the light reception-determining circuit, in the GUI for editing the input assign table, a detected transmission path (channel) may be displayed as a candidate to be assigned. In the GUI for editing the output assign table, a transmission path (channel) not detected may be displayed as a candidate to be assigned.

Regarding each video signal of the input and the output, it can be set to either one of a signal compressed by using a technique such as MPEG and an uncompressed signal (corresponding to SDI) through the GUI or the like for each video signal (for each channel). The processing or the circuit may be changed in a manner that depends on the setting such that processing according to each signal format is performed. The setting may be performed through the GUI. Alternatively, the setting may be determined on a basis of a frequency band and a processing speed. Alternatively, a system in which priorities may be set to the video signals for each channel and as many video signals as possible, which have higher priorities, may be changed into uncompressed format may be employed. In addition, the determination result may be transmitted to a transmission source of each video signal for causing the transmission source to transmit the video signal in that format.

Regarding each video signal of the input, an amount of buffering may be enabled to be set in a circuit of the input unit. If it is synchronized with the synchronization signal (House Synch) of the broadcasting system, the buffer size may be decreased, and may be, for example, one line. If it may not be synchronized with the synchronization signal (House Synch) of the broadcasting system, the buffer size may be increased, and may be, for example, two line. In this manner, problems may be prevented from occurring in the video signal processing even if signals arrive at varying times, for example.

The present technology can also take the following configurations.

(1) An effect switcher, including
an output terminal that outputs a plurality of first video signals to be transmitted to a multi-view processor, as an optical multiplex signal.

(2) The effect switcher according to (1), further including:
an output terminal that outputs a single second video signal to be transmitted to the multi-view processor; and
an information insertion unit that inserts, into the optical multiplex signal, information for designating a display region of an image based on the single second video signal on a screen on which an image based on each of the first video signals is displayed.

(3) The effect switcher according to (1) or (2), in which the multi-view processor
includes
an input terminal that inputs the optical multiplex signal,
an input terminal that inputs a video signal for emergency, and
a control terminal that receives a switching instruction, and
switches, in accordance with the switching instruction, between
a first mode on which images based on the plurality of first video signals obtained from the optical multiplex signal are simultaneously displayed on the screen, and
a second mode on which an image based on the video signal for emergency is displayed on the screen.

(4) The effect switcher according to any of (1) to (3), further including:
a plurality of video input circuits that externally input video signals;
a plurality of internal buses;
a selection circuit that selects one from among the plurality of video input circuits and connects the selected one to each of the plurality of internal buses;
a superimpose circuit that receives video signals from the plurality of internal buses;
a table that stores correspondence between input identifiers, which are given to the plurality of video input circuits correspondingly to the plurality of internal buses, and button numbers; and
a selection control circuit that obtains, when a button is operated with respect to a predetermined internal bus, an input identifier corresponding to a button number of the operated button by referring to the table, and controls the selection circuit such that a video input circuit corresponding to the input identifier is connected to the predetermined internal bus.

(5) The effect switcher according to (4), further including:
a display control unit that displays a user interface screen for editing the table; and
a table editor unit that receives, on the user interface screen, an operation of making an input identifier to correspond to a button number, and updates the table.

(6) The effect switcher according to (5), in which
the display control unit displays the input identifiers in groups on the user interface screen.

(7) A switcher system, including:
a switcher including a clip storage unit; and
a GUI control unit that is connected to the switcher through a control communication path, in which
the clip storage unit includes
a video signal generation circuit that supplies a cross point with a video signal, and
file storage connected to the video signal generation circuit through a dedicated wire, and
the GUI control unit is connected to a video server via a network.

(8) The switcher system according to (7), in which
the GUI control unit selectively displays
a first user interface screen showing a video file in the file storage of the clip storage unit, or
a second user interface screen showing a video file in the video server.

(9) The switcher system according to (8), in which
the GUI control unit
displays a third user interface screen for selecting display of the video file in the file storage of the clip storage unit or display of the video file in the video server, and
receives a selection operation on the third user interface screen, and displays the first user interface screen or the second user interface screen.

(10) The switcher system according to (8) or (9), in which
the GUI control unit
receives a selection operation of a video file on the first interface screen, and transmits, to the clip storage unit, a control command to control the clip storage unit to perform video output of the video file, and
receives a selection operation of a video file on the second user interface screen, and transmits, to the video server, a control command to perform video output of the video file.

(11) The switcher system according to any of (8) to (10), in which
the video signal generation circuit includes a video circuit for outputting a video file as a video signal, and
the GUI control unit receives a load operation of a video file on the first user interface screen, and transmits, to the clip storage unit, a load command to load the video file from the file storage into the video circuit.

(12) The switcher system according to (11), in which
the GUI control unit changes display of the loaded video file on the first user interface screen to indicate that the video file has been loaded.

(13) The switcher system according to any of (8) to (12), in which
the video server includes a video circuit for outputting a video file as a video signal, and
the GUI control unit receives a load operation of a video file on the second user interface screen, and transmits, to the video server, a load command to load the video file from the file storage to the video circuit.

(14) The switcher system according to (13), in which
the GUI control unit changes display of the loaded video file on the second user interface screen to indicate that the video file has been loaded.

(15) The switcher system according to (8) to (14), in which
the GUI control unit receives a transfer operation of a video file on the second user interface screen, and transmits, to the video server, a transfer command to transfer the video file to the clip storage unit.

3. Application Example

The technology according to the present disclosure is applicable to various products. For example, the technology according to the present disclosure may be applied to an operating room system.

Figure 28:
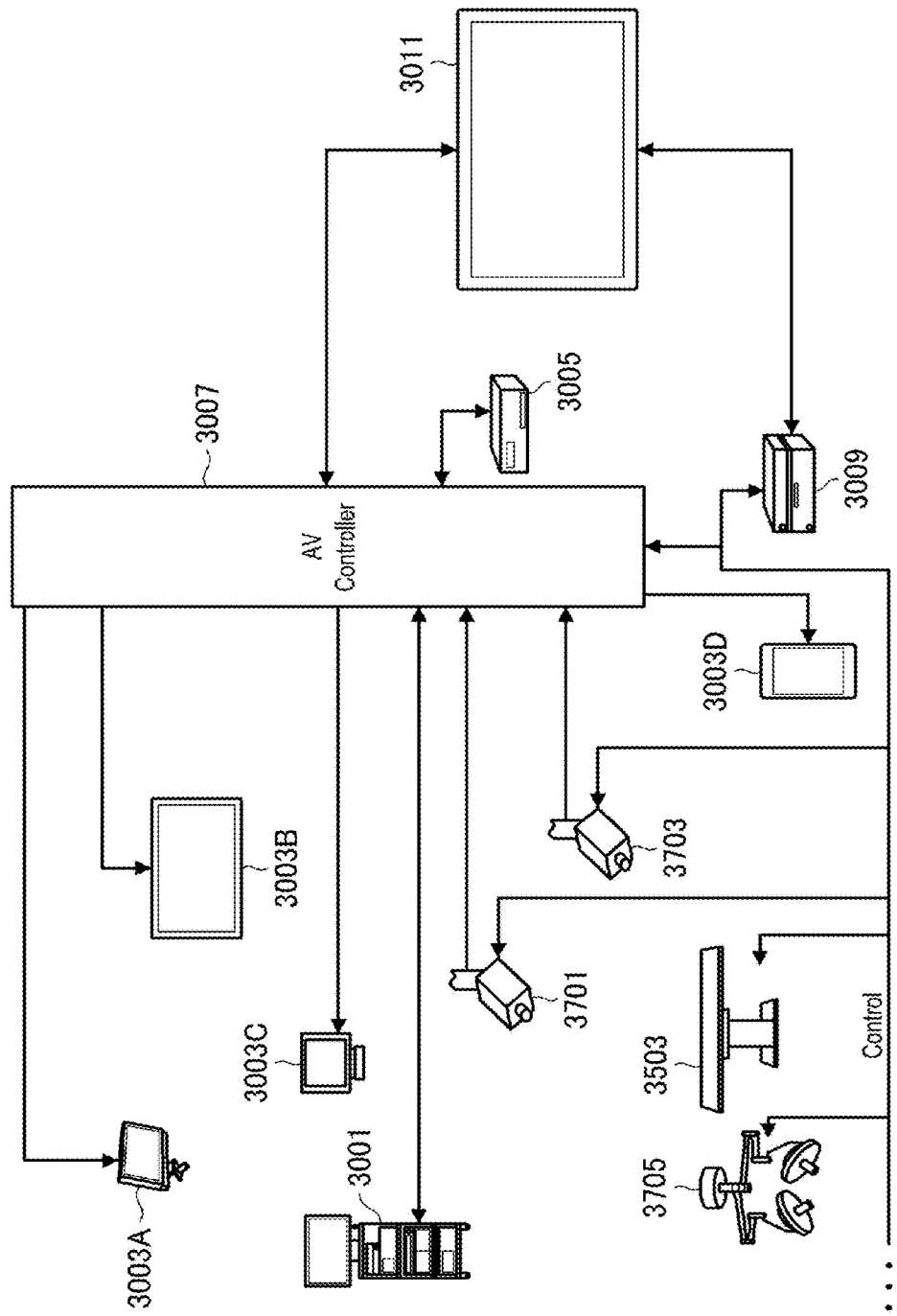
FIG. 28 A diagram schematically showing a configuration of an entire operating room system.

FIG. 28 is a diagram schematically showing an overall configuration of an operating room system 3000 to which the technology according to the present disclosure is applicable. Referring to FIG. 28, the operating room system 3000 is configured such that a group of apparatuses set in an operating room are capable of cooperating with one another via an audiovisual controller (AV Controller) 3007 and an operating room control apparatus 3009.

Various apparatuses can be set in the operating room. As an example, FIG. 28 shows a group of various apparatuses 3001 for an endoscopic surgery, a ceiling camera 3701 that is provided on a ceiling of the operating room and captures images of hands of a surgeon, an operating room camera 3703 that is provided on the ceiling of the operating room and captures images regarding a state of the entire operating room, a plurality of display apparatuses 3003A to 3003D, a recorder 3005, a patient bed 3503, and a lighting system 3705.

Here, of these apparatuses, the apparatus group 3001 belongs to an endoscopic surgery system 3050 to be described later and is constituted by an endoscope, a display apparatus that displays images captured by the endoscope, and the like. The various apparatuses belonging to the endoscopic surgery system 3050 are also called medical equipment. Meanwhile, the display apparatuses 3003A to 3003D, the recorder 3005, the patient bed 3503, and the lighting system 3705 are apparatuses that are provided separate from the endoscopic surgery system 3050 and provided in, for example, the operating room. These apparatuses not belonging to the endoscopic surgery system 3050 are also called non-medical equipment. The audiovisual controller 3007 and/or the operating room control apparatus 3009 control/controls operations of these medical equipment and non-medical equipment while cooperating with each other.

The audiovisual controller 3007 collectively controls processing related to image display in the medical equipment and non-medical equipment. Specifically, of the apparatuses provided in the operating room system 3000, the apparatus group 3001, the ceiling camera 3701, and the operating room camera 3703 may be apparatuses having a function of transmitting information to be displayed during a surgery (hereinafter, also referred to as display information) (hereinafter, also referred to as transmission source apparatuses). Further, the display apparatuses 3003A to 3003D may be apparatuses to which the display information is output (hereinafter, also referred to as output destination apparatuses). Further, the recorder 3005 may be an apparatus corresponding to both the transmission source apparatus and the output destination apparatus. The audiovisual controller 3007 has a function of controlling operations of the transmission source apparatuses and the output destination apparatuses to acquire display information from the transmission source apparatuses and transmit the display information to the output destination apparatuses to display or record the display information. Note that the display information refers to various images captured during a surgery, various types of information related to the surgery (e.g., body information of patient, past examination result, information about surgical method, etc.), and the like.

Specifically, information about an image of a surgical part in a body cavity of a patient, which has been captured by the endoscope, may be transmitted to the audiovisual controller 3007 from the apparatus group 3001 as the display information. Further, information about an image of hands of a surgeon, which has been captured by the ceiling camera 3701, may be transmitted from the ceiling camera 3701 as the display information. Further, information about an image showing a state of the entire operating room, which has been captured by the operating room camera 3703, may be transmitted from the operating room camera 3703 as the display information. Note that in a case where other apparatuses having an image pickup function exist in the operating room system 3000, the audiovisual controller 3007 may acquire information about images captured by the other apparatuses from the other apparatuses as the display information.

Alternatively, for example, information about these images captured in the past is recorded in the recorder 3005 by the audiovisual controller 3007. The audiovisual controller 3007 is capable of acquiring the information about the images captured in the past from the recorder 3005 as the display information. Note that various types of information related to a surgery may be recorded in advance in the recorder 3005.

The audiovisual controller 3007 causes at least one of the display apparatuses 3003A to 3003D as the output destination apparatuses to display the acquired display information (i.e., image captured during surgery or various types of information related to surgery). In the example shown in the figure, the display apparatus 3003A is a display apparatus that is hung from the ceiling of the operating room, the display apparatus 3003B is a display apparatus set on a wall surface of the operating room, the display apparatus 3003C is a display apparatus set on a desk in the operating room, and the display apparatus 3003D is a mobile apparatus having a display function (e.g., tablet PC (Personal Computer)).

Further, although not shown in FIG. 28, the operating room system 3000 may include an apparatus provided outside the operating room. The apparatus provided outside the operating room may be, for example, a server connected to a network structured in and outside a hospital, a PC used by a medical staff, a projector provided in a conference room of the hospital, and the like. In a case where there is such an external apparatus outside the hospital, the audiovisual controller 3007 can also cause the display information to be displayed on a display apparatus in a different hospital via a teleconference system or the like, for remote medical care.

The operating room control apparatus 3009 collectively controls processing other than the processing related to image display in the non-medical equipment. For example, the operating room control apparatus 3009 controls driving of the patient bed 3503, the ceiling camera 3701, the operating room camera 3703, and the lighting system 3705.

A centralized operation panel 3011 is provided in the operating room system 3000 so as to enable a user to give an instruction about the image display to the audiovisual controller 3007 or give an instruction about an operation of the non-medical equipment to the operating room control apparatus 3009 via the centralized operation panel 3011. The centralized operation panel 3011 is configured such that a touch panel is provided on a display surface of the display apparatus.

Figure 29:
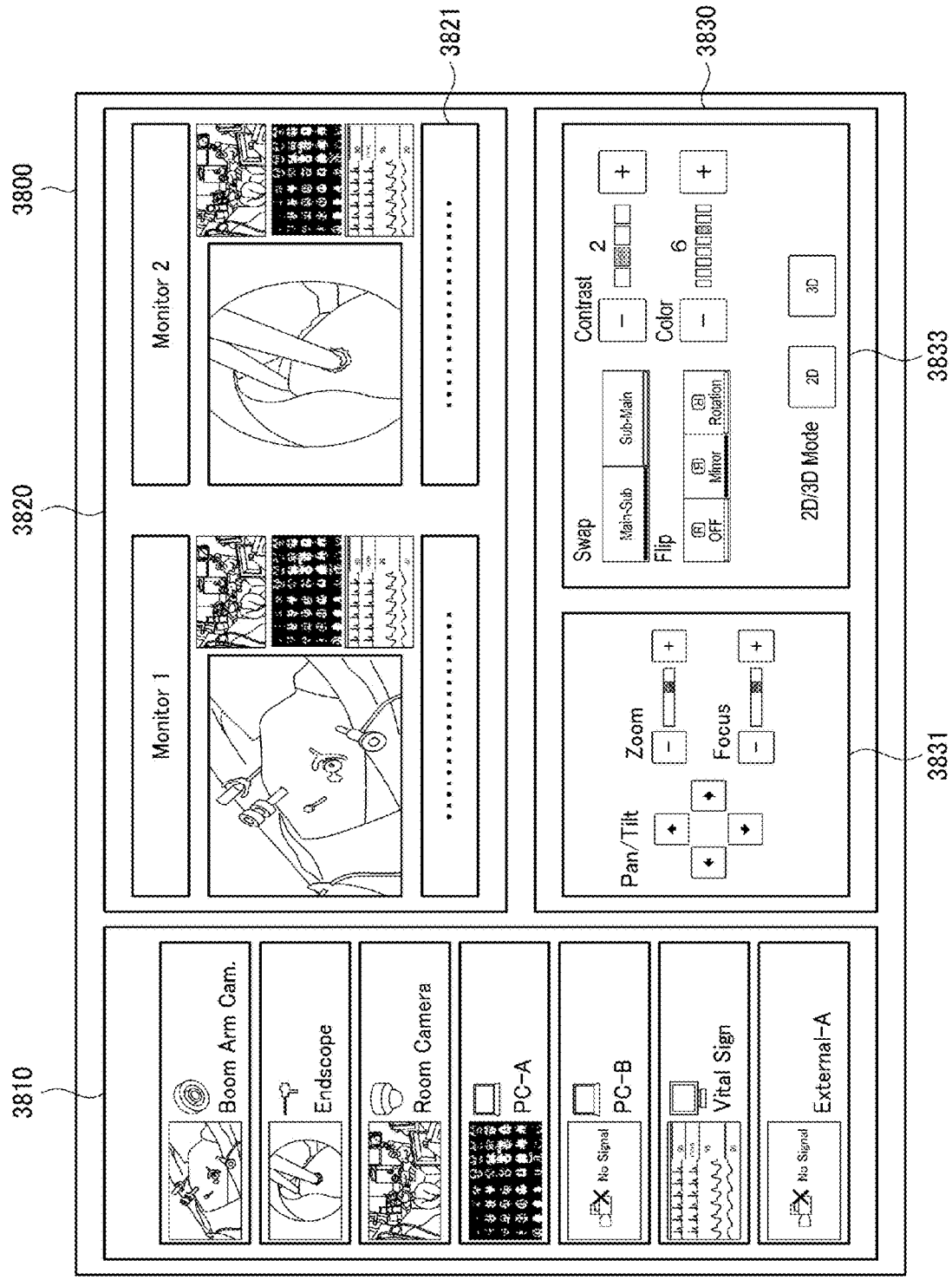
FIG. 29 A diagram showing a display example of an operation screen in a centralized operation panel.

FIG. 29 is a diagram showing a display example of an operation screen of the centralized operation panel 3011. FIG. 29 shows an example of an operation screen corresponding to a case where two display apparatuses are provided as the output destination apparatuses. Referring to FIG. 29, a transmission source selection area 3810, a preview area 3820, and a control area 3830 are provided in an operation screen 3800.

In the transmission source selection area 3810, the transmission source apparatus provided in the operating room system 3000 and a thumbnail image expressing display information that this transmission source apparatus includes are displayed in association with each other. The user can select display information that he/she wishes to display on the display apparatus from any of the transmission source apparatuses displayed in the transmission source selection area 3810.

In the preview area 3820, previews of screens to be displayed on two display apparatuses (Monitor 1 and Monitor 2) as the output destination apparatuses are displayed. In the example shown in the figure, four images are PinP-displayed for one display apparatus. The four images correspond to display information transmitted from the transmission source apparatuses selected in the transmission source selection area 3810. Of the four images, one is displayed relatively largely as a main image, and the remaining three images are displayed relatively small as sub-images. By appropriately selecting the area in which the four images are displayed, the user can exchange the main image and the sub-images. Further, a status display area 3821 is provided below the area in which the four images are displayed, and a surgery-related status (e.g., elapsed surgery time, body information of patient, etc.) may be appropriately displayed in that area.

In the control area 3830, a transmission source operation area 3831 in which GUI (Graphical User Interface) components for operating the transmission source apparatus are displayed and an output destination operation area 3833 in which GUI components for operating the output destination apparatus are displayed are provided. In the example shown in the figure, GUI components for performing various operations (pan, tilt, and zoom) on a camera in the transmission source apparatus having an image pickup function are provided in the transmission source operation area 3831. By appropriately selecting these GUI components, the user can control operations of the camera in the transmission source apparatus. Note that, although not shown in the figure, in a case where the transmission source apparatus selected in the transmission source selection area 3810 is a recorder (i.e., in a case where images recorded in the past in the recorder are displayed in the preview area 3820), GUI components for performing operations of reproduction, reproduction stop, rewind, fast-forward, and the like on the images may be provided in the transmission source operation area 3831.

Further, in the output destination operation area 3833, GUI components for performing various operations (swap, flip, color adjustment, contrast adjustment, and switching between 2D display and 3D display) regarding display on the display apparatus as the output destination apparatus are provided. By appropriately selecting these GUI components, the user can operate display on the display apparatus.

Note that the operation screen to be displayed on the centralized operation panel 3011 is not limited to the example shown in the figure, and it is also possible for the user to be capable of inputting operations to various apparatuses controllable by the audiovisual controller 3007 and the operating room control apparatus 3009 in the operating room system 3000 via the centralized operation panel 3011.

Figure 30:
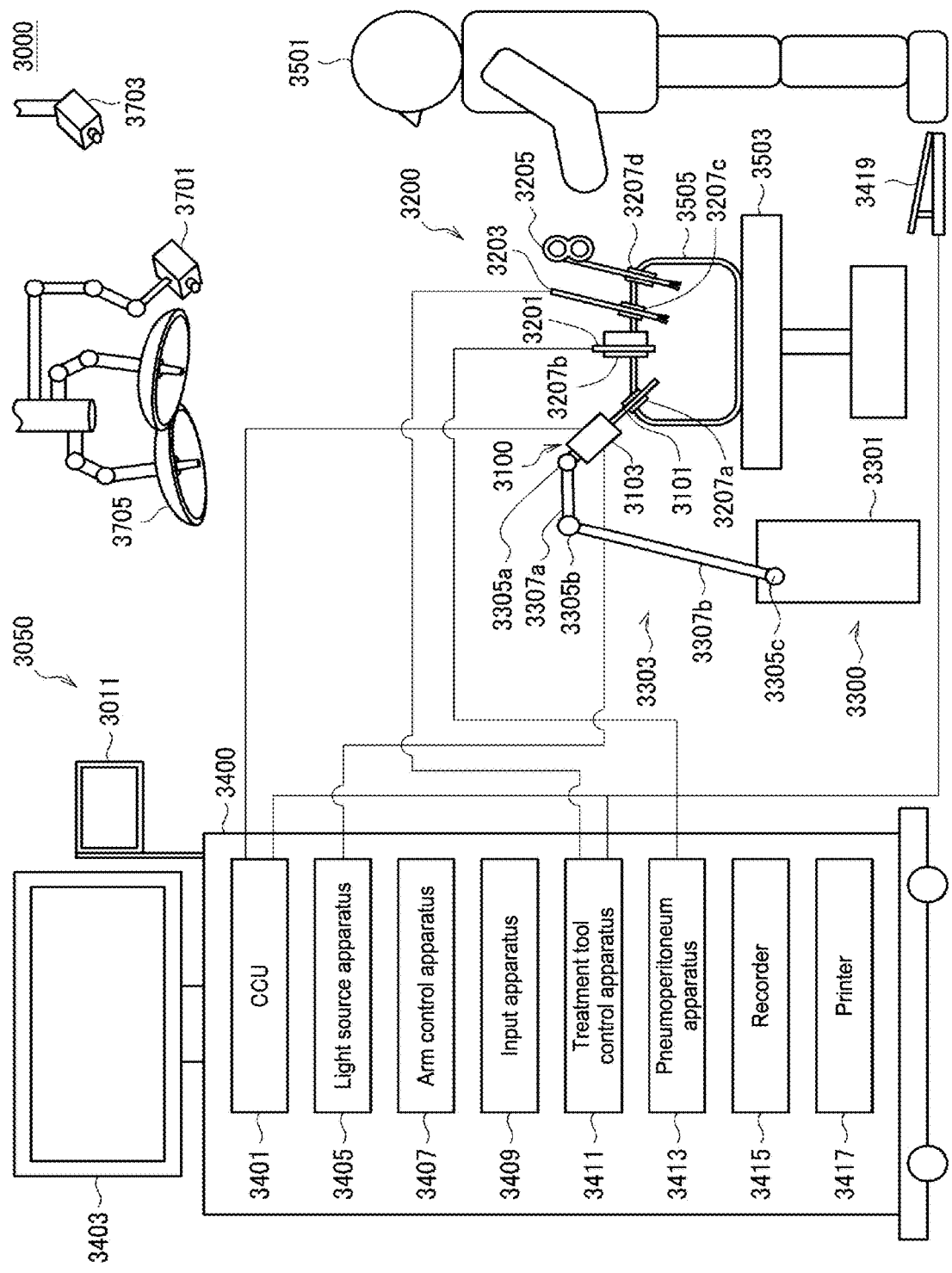
FIG. 30 A diagram showing an example of a state of surgery to which the operating room system is applied.

FIG. 30 is a diagram showing an example of a state of a surgery to which the operating room system described above is applied. The ceiling camera 3701 and the operating room camera 3703 are provided on the ceiling of the operating room so as to be capable of capturing hands of a surgeon (doctor) 3501 performing a treatment on an affected area of a patient 3505 on the patient bed 3503 and a state of the entire operating room. The ceiling camera 3701 and the operating room camera 3703 may have a magnification adjustment function, a focal distance adjustment function, a photographing direction adjustment function, and the like. The lighting system 3705 is provided on the ceiling of the operating room and illuminates at least the hands of the surgeon 3501. The lighting system 3705 may be capable of appropriately adjusting an illumination light amount, a wavelength (color) of illumination light, a light irradiation direction, and the like.

As shown in FIG. 28, the endoscopic surgery system 3050, the patient bed 3503, the ceiling camera 3701, the operating room camera 3703, and the lighting system 3705 are connected while being capable of cooperating with one another via the audiovisual controller 3007 and the operating room control apparatus 3009 (not shown in FIG. 30). The centralized operation panel 3011 is provided in the operating room so as to enable the user to appropriately operate these apparatuses in the operating room via the centralized operation panel 3011 as described above.

Hereinafter, a configuration of the endoscopic surgery system 3050 will be described in detail. As shown in the figure, the endoscopic surgery system 3050 includes an endoscope 3100, other operating tools 3200, a support arm apparatus 3300 that supports the endoscope 3100, and a cart 3400 equipped with various apparatuses for an endoscopic surgery.

In the endoscopic surgery, a plurality of cylindrical perforating tools called trocars 3207a to 3207d are punctured into an abdominal wall instead of opening the abdomen by cutting the abdominal wall. Then, a lens tube 3101 of the endoscope 3100 and the other operating tools 3200 are inserted into a body cavity of the patient 3505 from the trocars 3207a to 3207d. In the example shown in the figure, a pneumoperitoneum tube 3201, an energy treatment tool 3203, and forceps 3205 are inserted into the body cavity of the patient 3505 as the other operating tools 3200. Further, the energy treatment tool 3203 is a treatment tool for performing tissue incision and ablation, sealing of blood vessels, or the like by a high-frequency current or ultrasonic vibration. Note that the operating tools 3200 shown in the figure are merely examples, and various operating tools generally used in an endoscopic surgery, such as tweezers and a retractor, may be used as the operating tools 3200, for example.

An image of a surgical part in the body cavity of the patient 3505, which has been captured by the endoscope 3100, is displayed on a display apparatus 3403. The surgeon 3501 uses the energy treatment tool 3203 and the forceps 3205 to perform a treatment such as ablation of an affected part, for example, while viewing the image of the surgical part displayed on the display apparatus 3403 in real time.

Note that, although not shown in the figure, the pneumoperitoneum tube 3201, the energy treatment tool 3203, and the forceps 3205 are supported by the surgeon 3501, an assistant, and the like during the surgery. Alternatively, although only one support arm apparatus 3300 that supports the endoscope 3100 is provided in the example shown in the figure, a plurality of support arm apparatuses 3300 may be provided and the pneumoperitoneum tube 3201, the energy treatment tool 3203, and the forceps 3205 may be respectively supported by the plurality of support arm apparatuses 3300.

(Support Arm Apparatus)

The support arm apparatus 3300 includes an arm portion 3303 that extends from a base portion 3301. In the example shown in the figure, the arm portion 3303 includes joint portions 3305a, 3305b, and 3305c and links 3307a and 3307b and is driven under control of an arm control apparatus 3407. The endoscope 3100 is supported by the arm portion 3303 such that position and posture thereof are controlled. Accordingly, the position of the endoscope 3100 can be stably fixed.

(Endoscope)

The endoscope 3100 includes the lens tube 3101 and a camera head 3103. An area of lens tube 3101, which is at a predetermined distance from a tip end, is inserted into the body cavity of the patient 3505. The camera head 3103 is connected to a base end of the lens tube 3101. Although the endoscope 3100 configured as a so-called hard mirror including a hard lens tube 3101 is illustrated in the example shown in the figure, the endoscope 3100 may alternatively be configured as a so-called flexible mirror including a flexible lens tube 3101.

An opening into which an objective lens is fit is provided at a tip end of the lens tube 3101. A light source apparatus 3405 is connected to the endoscope 3100, and light generated by the light source apparatus 3405 is guided to the tip end of the lens tube 3101 by a lightguide extending inside the lens tube 3101 to be irradiated toward an observation target in the body cavity of the patient 3505 via the objective lens. Note that the endoscope 3100 may be a direct view endoscope, a perspective view endoscope, or a side view endoscope.

An optical system and an image pickup device are provided inside the camera head 3103, and reflected light from the observation target (observation light) is collected in the image pickup device by the optical system. The observation light is photoelectrically converted by the image pickup device so as to generate electrical signals corresponding to the observation light, that is, image signals corresponding to an observation image. The image signals are transmitted to a camera control unit (CCU) 3401 as RAW data. Note that by appropriately driving the optical system, the camera head 3103 is provided with a magnification function and a focal distance adjustment function.

Note that for supporting a stereoscopic view (3D display) or the like, for example, a plurality of image pickup devices may be provided in the camera head 3103. In this case, a plurality of relay optical systems are provided inside the lens tube 3101 for guiding observation light to each of the plurality of image pickup devices.

(Various Apparatuses Mounted on Cart)

The CCU 3401 includes a CPU (Central Processing Unit), a GPU (Graphics Processing Unit), and the like and collectively controls operations of the endoscope 3100 and the display apparatus 3403. Specifically, the CCU 3401 performs various types of image processing for displaying an image based on the image signals, such as development processing (demosaic processing), on the image signals received from the camera head 3103. The CCU 3401 provides the image signals subjected to the image processing to the display apparatus 3403. Further, the audiovisual controller 3007 shown in FIG. 28 is connected to the CCU 3401. The CCU 3401 also provides the image signals subjected to the image processing to the audiovisual controller 3007. Further, the CCU 3401 transmits a control signal to the camera head 3103 to control driving thereof. The control signal may include information related to image pickup conditions such as a magnification and a focal distance. The information related to the image pickup conditions may be input via an input apparatus 3409 or may be input via the centralized operation panel 3011 described above.

The display apparatus 3403 displays an image based on the image signals subjected to the image processing by the CCU 3401 under control of the CCU 3401. In a case where the endoscope 3100 is an endoscope that supports high-resolution photographing, such as 4K and 8K, and/or supports 3D display, for example, a display apparatus capable of performing high-resolution display and/or a display apparatus capable of performing 3D display is/are used as the display apparatus 3403.

The light source apparatus 3405 includes a light source such as an LED (Light Emitting Diode), for example, and supplies illumination light to the endoscope 3100 when photographing a surgical part.

The arm control apparatus 3407 includes a processor such as a CPU, for example, and is operated in accordance with a predetermined program so as to control driving of the arm portion 3303 of the support arm apparatus 3300 by a predetermined control method.

The input apparatus 3409 is an input interface with respect to the endoscopic surgery system 3050. The user is capable of inputting various types of information and inputting instructions with respect to the endoscopic surgery system 3050 via the input apparatus 3409. For example, the user inputs various types of surgery-related information such as body information of a patient and information about a surgical method in a surgery via the input apparatus 3409. Moreover, for example, the user inputs an instruction to drive the arm portion 3303, an instruction to change the image pickup conditions (type of irradiation light, magnification, focal distance, etc.) of the endoscope 3100, and the like via the input apparatus 3409.

The type of input apparatus 3409 is not limited, and the input apparatus 3409 may be various well-known input apparatuses. As the input apparatus 3409, for example, a mouse, a keyboard, a touch panel, a switch, a foot switch 3419 and/or a lever, and the like are applicable. In a case where a touch panel is used as the input apparatus 3409, the touch panel may be provided on a display surface of the display apparatus 3403.

Alternatively, the input apparatus 3409 may be, for example, a device worn by the user, such as a glasses-type wearable display and an HMD (Head Mounted Display), and various inputs may be performed in accordance with gestures or lines of sight of the user detected by these devices. Alternatively, the input apparatus 3409 may be a camera capable of detecting movements of the user. Various inputs may be performed in accordance with gestures or lines of sight of the user detected from a video captured by this camera. Alternatively, the input apparatus 3409 may be a microphone capable of picking up voices of the user. Various inputs may be performed by audio input via this microphone. By configuring the input apparatus 3409 such that various types of information can be input in a non-contact manner in this way, it becomes possible particularly for a user belonging to a clean area (e.g., surgeon 3501) to operate an apparatus belonging to an unclean area in a non-contact manner. Further, since the user can operate the apparatus without releasing the surgical tool at hand, convenience for the user is improved.

A processing tool control apparatus 3411 controls driving of the energy treatment tool 3203 for tissue ablation and incision, sealing of blood vessels, or the like. For the purpose of securing eyesight of the endoscope 3100 and securing a work space of a surgeon, a pneumoperitoneum apparatus 3413 pumps in gas in the body cavity of the patient 3505 via the pneumoperitoneum tube 3201 so as to blow it up. A recorder 3415 is an apparatus capable of recording various types of surgery-related information. A printer 3417 is an apparatus capable of printing the various types of surgery-related information in various formats such as a text, an image, and a graph.

Hereinafter, particularly characteristic configurations of the endoscopic surgery system 3050 will be described in more detail.

(Camera Head and CCU)

Figure 31:
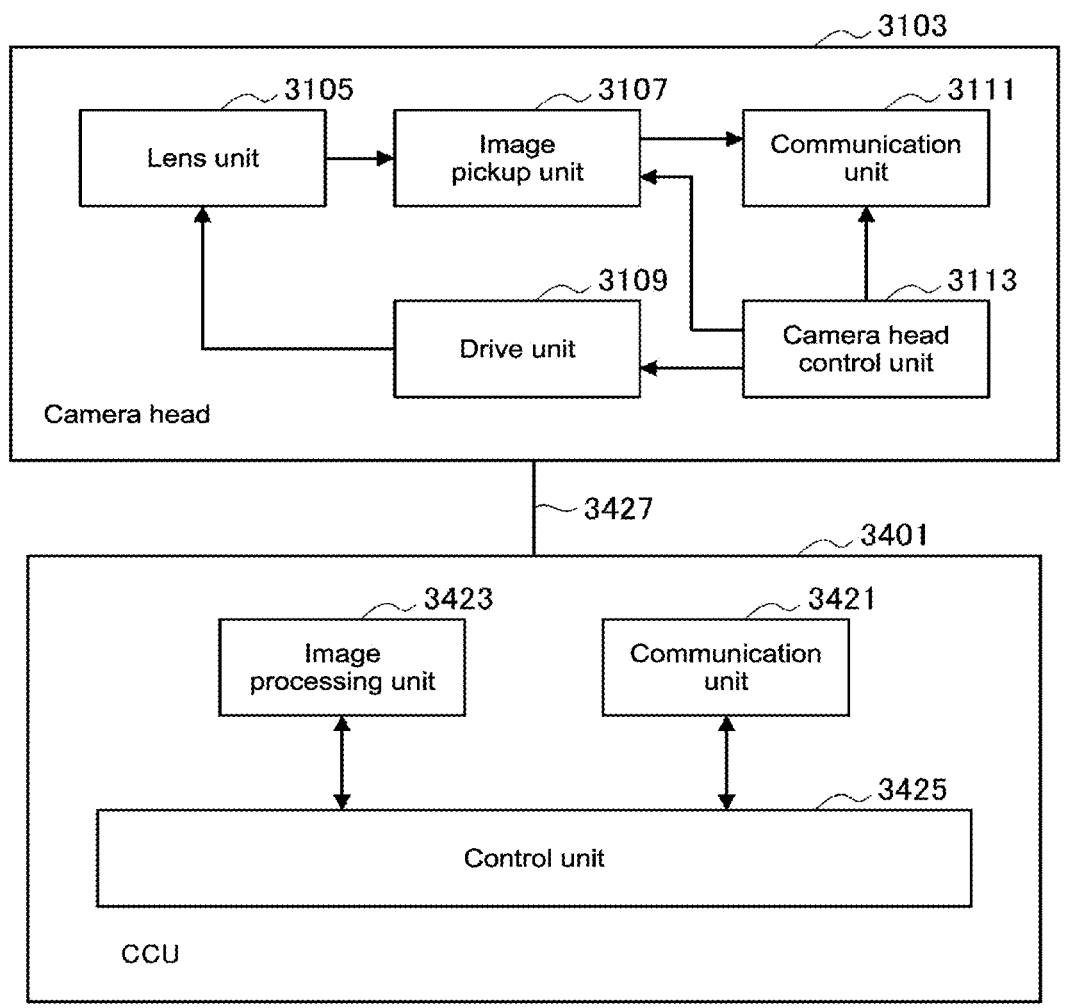
FIG. 31 A block diagram showing examples of functional configurations of a camera head and a CCU shown in FIG. 30.

Referring to FIG. 31, functions of the camera head 3103 of the endoscope 3100 and the CCU 3401 will be described in more detail. FIG. 31 is a block diagram showing examples of functional configurations of the camera head 3103 and the CCU 3401 shown in FIG. 30.

Referring to FIG. 31, the camera head 3103 includes, as functions thereof, a lens unit 3105, an image pickup unit 3107, a drive unit 3109, a communication unit 3111, and a camera head control unit 3113. Further, the CCU 3401 includes, as functions thereof, a communication unit 3421, an image processing unit 3423, and a control unit 3425. The camera head 3103 and the CCU 3401 are connected while being mutually communicable via a transmission cable 3427.

First, the functional configuration of the camera head 3103 will be described. The lens unit 3105 is an optical system provided at a connection portion that connects it to the lens tube 3101. Observation light taken in from the tip end of the lens tube 3101 is guided to the camera head 3103 and enters the lens unit 3105. The lens unit 3105 is configured by combining a plurality of lenses including a zoom lens and a focus lens. The lens unit 3105 has optical characteristics thereof adjusted such that the observation light is collected on a light-receiving surface of an image pickup device of the image pickup unit 3107. Further, the zoom lens and the focus lens are configured such that positions thereof on an optical axis are movable for adjusting magnification and focal point of a captured image.

The image pickup unit 3107 includes the image pickup device and is arranged subsequent to the lens unit 3105. The observation light that has passed the lens unit 3105 is collected on the light-receiving surface of the image pickup device, and image signals corresponding to an observation image are generated by photoelectric conversion. The image signals generated by the image pickup unit 3107 are provided to the communication unit 3111.

As the image pickup device included in the image pickup unit 3107, a sensor that includes a Bayer array and is capable of color-photographing is used. This image pickup device may be various well-known image pickup devices such as a CMOS (Complementary Metal Oxide Semiconductor) image sensor and CCD (Charge Coupled Device) image sensor.

Note that a sensor capable of supporting photographing of a high-resolution image of 4K or more, for example, may be used as the image pickup device included in the image pickup unit 3107. Since an image of a surgical part can be obtained with a high resolution, the surgeon 3501 can grasp a state of the surgical part more specifically and smoothly proceed the surgery.

Further, the image pickup device included in the image pickup unit 3107 may be one (so-called single-plate type) or may be multiple (so-called multiple-plate type). In a case where the image pickup unit 3107 is of the multiple-plate type, a color image may be obtained in such a manner that image signals respectively corresponding to RGB are generated by the respective image pickup devices and combined, for example. Alternatively, the image pickup unit 3107 may include a pair of image pickup devices for respectively acquiring image signals for a right eye and a left eye that correspond to 3D display. By performing 3D display, the surgeon 3501 can more accurately grasp a depth of a body tissue at the surgical part. Note that in a case where the image pickup unit 3107 is of the multiple plate type, a plurality of lens units 3105 may be provided, corresponding to the respective image pickup devices.

Further, the image pickup unit 3107 does not necessarily need to be provided in the camera head 3103. For example, the image pickup unit 3107 may be provided right after the objective lens inside the lens tube 3101.

The drive unit 3109 includes an actuator and causes the zoom lens and focus lens of the lens unit 3105 to move by a predetermined distance along the optical axis under control of the camera head control unit 3113. Accordingly, the magnification and focal point of the captured image obtained by the image pickup unit 3107 can be appropriately adjusted.

The communication unit 3111 includes a communication apparatus for transmitting and receiving various types of information to/from the CCU 3401. The communication unit 3111 transmits, as RAW data, the image signals obtained from the image pickup unit 3107 to the CCU 3401 via the transmission cable 3427. At this time, it is favorable to transmit the image signals by optical communication for displaying the captured image of the surgical part with a low latency. This is because, since the surgeon 3501 performs a surgery while observing a state of the affected part using the captured image during the surgery, displaying a moving image of the surgical part as close to real time as possible is demanded for a more-positive and safer surgery. In a case where optical communication is performed, a photoelectric conversion module that converts electrical signals into optical signals is provided in the communication unit 3111. After the image signals are converted into optical signals by the photoelectric conversion module, the signals are transmitted to the CCU 3401 via the transmission cable 3427.

Further, the communication unit 3111 receives a control signal for controlling driving of the camera head 3103 from the CCU 3401. The control signal includes, for example, information related to image pickup conditions, such as information about designating a frame rate of a captured image, information about designating an exposure value during photographing, and/or information about designating magnification and focal point of a captured image. The communication unit 3111 provides the received control signal to the camera head control unit 3113. Note that the control signal from the CCU 3401 may also be transmitted by optical communication. In this case, a photoelectric conversion module that converts optical signals into electrical signals is provided in the communication unit 3111, and after the control signal is converted into an electrical signal by the photoelectric conversion module, the signal is transmitted to the camera head control unit 3113.

Note that the image pickup conditions described above such as a frame rate, an exposure value, a magnification, and a focal point may be appropriately designated by the user or may be automatically set by the control unit 3425 of the CCU 3401 on a basis of the acquired image signals. In the latter case, a so-called AE (Auto Exposure) function, a so-called AF (Auto Focus) function, and a so-called AWB (Auto White Balance) function are provided in the endoscope 3100.

The camera head control unit 3113 controls the driving of the camera head 3103 on a basis of the control signal from the CCU 3401 received via the communication unit 3111. For example, the camera head control unit 3113 controls the driving of the image pickup device of the image pickup unit 3107 on a basis of the information about designating a frame rate of a captured image and/or the information about designating an exposure during photographing. Further, for example, the camera head control unit 3113 appropriately moves the zoom lens and focal lens of the lens unit 3105 via the drive unit 3109 on a basis of the information about designating magnification and focal point of a captured image.

Next, the functional configuration of the CCU 3401 will be described. The communication unit 3421 includes a communication apparatus for transmitting and receiving various types of information to/from the camera head 3103. The communication unit 3421 receives image signals transmitted from the camera head 3103 via the transmission cable 3427. At this time, as described above, the image signals can be transmitted favorably by optical communication. In this case, a photoelectric conversion module that converts optical signals into electrical signals is provided in the communication unit 3421 in accordance with the optical communication. The communication unit 3421 provides the image signals converted into electrical signals to the image processing unit 3423.

Further, the communication unit 3421 transmits a control signal for controlling the driving of the camera head 3103 to the camera head 3103. This control signal may also be transmitted by optical communication.

The image processing unit 3423 performs various types of image processing on the image signals as RAW data transmitted from the camera head 3103. As the image processing, for example, various types of well-known signal processing such as development processing, high image quality processing (band emphasis processing, super-resolution processing, NR (Noise reduction) processing, hand movement correction processing, etc.), and/or enlargement processing (electronic zoom processing) may be performed. Further, in a case where the endoscope 3100 has an AE function, an AF function, and an AWB function, the image processing unit 3423 may perform wave-detection processing on the image signals for performing the AE, AF, and AWB.

The image processing unit 3423 includes a processor such as a CPU and a GPU. By the processor operating in accordance with a predetermined program, the image processing and wave-detection processing described above can be performed. Note that in a case where the image processing unit 3423 includes a plurality of GPUs, the image processing unit 3423 may appropriately divide the information associated with the image signals and perform image processing by the plurality of GPUs in parallel.

The control unit 3425 performs various types of control related to photographing of a surgical part by the endoscope 3100 and display of a captured image. For example, the control unit 3425 generates a control signal for controlling the driving of the camera head 3103. At this time, in a case where the image pickup conditions are input by the user, the control unit 3425 generates a control signal on a basis of the user input. Alternatively, in a case where the endoscope 3100 is provided with the AE function, the AF function, and the AWB function, the control unit 3425 appropriately calculates optimal exposure value, focal distance, and white balance in accordance with a result of the wave-detection processing by the image processing unit 3423, to generate a control signal. Note that various well-known methods may be used as a calculation method for control values associated with the AE function, the AF function, and the AWB function.

Further, the control unit 3425 may cause the display apparatus 3403 to display the image of the surgical part on a basis of the image signals subjected to the image processing by the image processing unit 3423. At this time, the control unit 3425 recognizes various objects in the surgical part image using various image recognition technologies. For example, the control unit 3425 detects an edge shape, color, and the like of an object included in the surgical part image so as to be capable of recognizing the operating tool such as forceps, a specific body part, bleeding, mist in the use of the energy treatment tool 3203, and the like. When displaying the surgical part image on the display apparatus 3403, the control unit 3425 may superimpose various types of surgery support information about the surgical part image using a result of the recognition. By superimposing the surgery support information and presenting it to the surgeon 3501, it becomes possible to proceed with more-positive and safer surgery.

The transmission cable 3427 connecting the camera head 3103 and the CCU 3401 is an electrical signal cable that supports communication of electrical signals, an optical fiber that supports optical communication, or a composite cable thereof.

Here, although communication is performed via wires using the transmission cable 3427 in the example shown in the figure, communication between the camera head 3103 and the CCU 3401 may be wireless communication. In a case where communication between those two is performed wirelessly, there is no need to provide the transmission cable 3427 in the operating room, so a situation where movements of medical staffs in the operating room are inhibited by the transmission cable 3427 can be eliminated.

The example of the operating room system 3000 to which the technology according to the present disclosure is applicable has been described above. The technology according to the present disclosure may be favorably applied to the audiovisual controller 3007 of the above-mentioned configurations. Specifically, the audiovisual controller 3007 is provided with an output terminal that outputs a plurality of video signals (image signals) to be transmitted to the display apparatus 3003B, the centralized operation panel 3011, and the like, as an optical multiplex signal. By applying the technology according to the present disclosure to the audiovisual controller 3007, the display apparatus 3003B and the centralized operation panel 3011 can be efficiently supplied with a plurality of video signals (image signals).

Note that, although the case where a medical system applied to the operating room system 3000 is the endoscopic surgery system 3050 has been described as an example herein, the configuration of the operating room system 3000 is not limited to such an example. For example, a microscopic surgery system may be applied to the operating room system 3000 instead of the endoscopic surgery system 3050.

REFERENCE SIGNS LIST 10 broadcasting system
11*a* key source bus
11*b* key fill bus
13*a* background A bus
13*b* background B bus
14 spare input bus
17 program output line
18 preview output line
51 key processor
55 mixer
61 video processor
101 sector
102 global maintenance center
103 system maintenance computer
104 remote terminal
105 system gateway
106 external system
107 effect server
108 video server
108*a* storage
108*b* video circuit
111 emergency switch
112 multi viewer processor
112*a* control terminal
113 vision mixer main frame
114 video processor
115 vision mixer controller
115*a* storage
115*a* storage
115*b* video frame memory
115*c* microcomputer
115*d* video output circuit
116 control panel
117 GUI panel
121 WDM optical-to-electrical converter
122 camera
123 video processor
124, 125 network switching hub
126 electrical-to-optical converter
127 broadcast master system
128 display
131 video mixing circuit
132 IP-SDI input unit
133 IP-Sync input unit
134 IP-SDI output unit
135 IP-Sync output unit
136, 137 WDM electrical-to-optical converter
141 IP-SDI output unit
142 network switching hub
143 IP-SDI input unit
201 input block
202 output block
203 to 209 output bus

The invention claimed is:
1. A switcher system, comprising:
video mixing circuitry that includes:
internal busses defining cross points;
an input terminal configured to receive a plurality of first video signals and supply the plurality of first video signals to first corresponding cross points of the cross points;
a video signal generation circuit configured to generate a second video signal; and
a storage connected to the video signal generation circuit through a dedicated connection, and configured to
store the second video signal,
supply the second video signal to second corresponding cross points of the cross points, and
output an electrical signal that carries the second video signal;

control circuitry coupled with the video mixing circuitry and configured to:
  control display of a Graphic User Interface (GUI) screen; and
  control an operation of the video mixing circuitry in response to a user operation of the GUI screen;
an output terminal configured to output (i) a plurality of video signals from at least one of the first corresponding cross points or the second corresponding cross points and (ii) information for designating a display region of an image of the second video signal on a screen to electrical-to-optical conversion circuitry; and
the electrical-to-optical conversion circuitry configured to output an optical multiplexed signal, the optical multiplexed signal carrying (i) the plurality of video signals from the output terminal and (ii) the information for designating the display region of the image of the second video signal on the screen.

2. The switcher system according to claim 1, wherein the control circuitry is coupled with a video server and is configured to control the display of the GUI screen to selectively display
  a first user interface screen showing a video file in the storage, or
  a second user interface screen showing a video file in the video server.

3. The switcher system according to claim 2, wherein the control circuitry is further configured to:
  control display of a third user interface screen for selecting display of the video file in the storage or display of the video file in the video server, and
  receive a selection operation on the third user interface screen, and control the display of the first user interface screen or the second user interface screen according to the selection operation.

4. The switcher system according to claim 2, wherein the control circuitry is further configured to:
  receive a selection operation of a video file on the first interface screen, and transmit, to the storage, a control command to control the storage to perform output of the video file; or
  receive a selection operation of a video file on the second user interface screen, and transmit, to the video server, a control command to perform output of the video file.

5. The switcher system according to claim 2, wherein
  the video signal generation circuit includes a video circuit for outputting a selected video file as a video signal, and
  the control circuitry is further configured to receive a load operation of the selected video file on the first user interface screen, and transmit, to the storage, a load command to load the selected video file from the storage into the video circuit.

6. The switcher system according to claim 5, wherein the control circuitry is further configured to
  change display of the selected video file on the first user interface screen to indicate that the video file has been loaded.

7. The switcher system according to claim 2, wherein
  the video server includes a video circuit for outputting a video file as a selected video signal, and
  the control circuitry is further configured to receive a load operation of the selected video file on the second user interface screen, and transmit, to the video server, a load command to load the selected video file to the video circuit.

8. The switcher system according to claim 7, wherein the control circuitry is further configured to
  change display of the selected video file on the second user interface screen to indicate that the video file has been loaded.

9. The switcher system according to claim 2, wherein the control circuitry is further configured to
  receive a transfer operation of a selected video file on the second user interface screen, and transmit, to the video server, a transfer command to transfer the selected video file to the storage.

* * * * *